United States Patent [19]

Beyers, II et al.

[11] Patent Number: 5,724,525
[45] Date of Patent: Mar. 3, 1998

[54] SYSTEM AND METHOD FOR REMOTELY SELECTING SUBSCRIBERS AND CONTROLLING MESSAGES TO SUBSCRIBERS IN A CABLE TELEVISION SYSTEM

[75] Inventors: Robert J. Beyers, II, Snellville; Gregory S. Durden, Jonesboro; M. Kent Ivey, Chamblee; Curt M. Kuban, Snellville, all of Ga.

[73] Assignee: Scientific-Atlanta, Inc., Norcross, Ga.

[21] Appl. No.: 412,090

[22] Filed: Mar. 28, 1995

Related U.S. Application Data

[63] Continuation of Ser. No. 18,933, Feb. 16, 1993, abandoned.

[51] Int. Cl.$^6$ .................................................. G06F 157/00
[52] U.S. Cl. .................................................. 395/240; 348/3
[58] Field of Search ..................... 364/401; 358/86, 358/85, 84; 380/20, 10; 348/3, 7, 10, 12; 395/240, 3

[56] References Cited

U.S. PATENT DOCUMENTS

| | | |
|---|---|---|
| 4,323,922 | 4/1982 | den Toonder et al. ............... 358/117 |
| 4,829,569 | 5/1989 | Seth-Smith et al. ................. 380/10 |
| 4,866,770 | 9/1989 | Seth-Smith et al. ................. 380/20 |
| 4,885,775 | 12/1989 | Lucas ................................. 380/10 |
| 4,893,248 | 1/1990 | Pitts et al. ........................ 364/464.01 |
| 4,924,498 | 5/1990 | Farmer et al. ...................... 380/15 |
| 5,001,554 | 3/1991 | Johnson et al. .................... 358/86 |
| 5,054,071 | 10/1991 | Bacon ................................ 381/12 |
| 5,058,160 | 10/1991 | Banker et al. ..................... 380/20 |
| 5,247,364 | 9/1993 | Banker et al. ..................... 358/191.1 |
| 5,251,324 | 10/1993 | McMullan, Jr. ..................... 455/2 |
| 5,260,778 | 11/1993 | Kauffman et al. .................. 358/86 |

FOREIGN PATENT DOCUMENTS 2 118 750  11/1983  United Kingdom.

OTHER PUBLICATIONS

Scientific–Atlanta Product Catalog, date: Jun. 1991.
Scientific–Atlanta 8600 Addressable System Host Computer Interface Specification, date: Feb. 22, 1991.

*Primary Examiner*—Jack B. Harvey
*Assistant Examiner*—Xuonk Chung-Trans
*Attorney, Agent, or Firm*—Kenneth M. Massaroni; John Victor Pezdek

[57] ABSTRACT

A system and method are provided for selecting groups of one or more cable television subscribers remotely from a billing computer using data fields in either the billing computer database or a system control computer database. A selection criteria language may be used for selecting subscribers based on data fields in the system control database. Once a group of cable subscribers has been selected, an on-screen message may be remotely created and transmitted to the selected subscribers using cable transmission apparatus. The method provides a way of correlating subscriber information in a comprehensive subscriber database (such as may exist on a billing computer) with other subscriber information in a more limited database stored on a system control computer to allow on-screen messages to be targeted at subscribers selected on the basis of criteria from either database. It also allows message attributes (such as duration of display, colors, and message alerts) to be specified remotely from a billing computer rather than requiring the presence of a human operator at the system control computer.

33 Claims, 24 Drawing Sheets

FIG. 4(A)

|  | IN BAND VIDEO | IN BAND AUDIO | OUT-OF-BAND |
|---|---|---|---|
| TYPE A TRANSACTION |  |  |  |
| NUMBER OF BYTES | 8-24 BYTES | 8-24 | 8-24 |
| PEDESTAL | YES | NO | NO |
| PREAMBLE | YES | YES | YES |
| TIME/ADDRESS | YES | YES | YES |
| TRANSACTION CODE | YES | YES | YES |
| DATA | YES | YES | YES |
| ERROR DETECTION/ CORRECTION | YES | YES | YES |
| FIELD FLAG | NO | YES | NO |
| BITS HIGH CHECK | NO | YES | NO |
| SCRAMBLING MODE | YES | YES | NO |
| TYPE B TRANSACTION |  |  |  |
| NUMBER OF BYTES | 12-36 BYTES | 12-36 BYTES | 12-36 BYTES |
| TYPE C TRANSACTION |  |  |  |
| NUMBER OF BYTES | 16-48 BYTES | 16-48 BYTES | 16-48 BYTES |
| TYPE D TRANSACTION |  |  |  |
| NUMBER OF BYTES | 24-72 BYTES | 24-72 BYTES | 24-72 BYTES |
| TYPE E TRANSACTION |  |  |  |
| NUMBER OF BYTES | 64-192 | POSSIBLE IF NONTIMING DATA IS AT A BIT RATE ABOVE APPROXIMATELY 230 BITS PER FIELD | 64-192 BYTES |

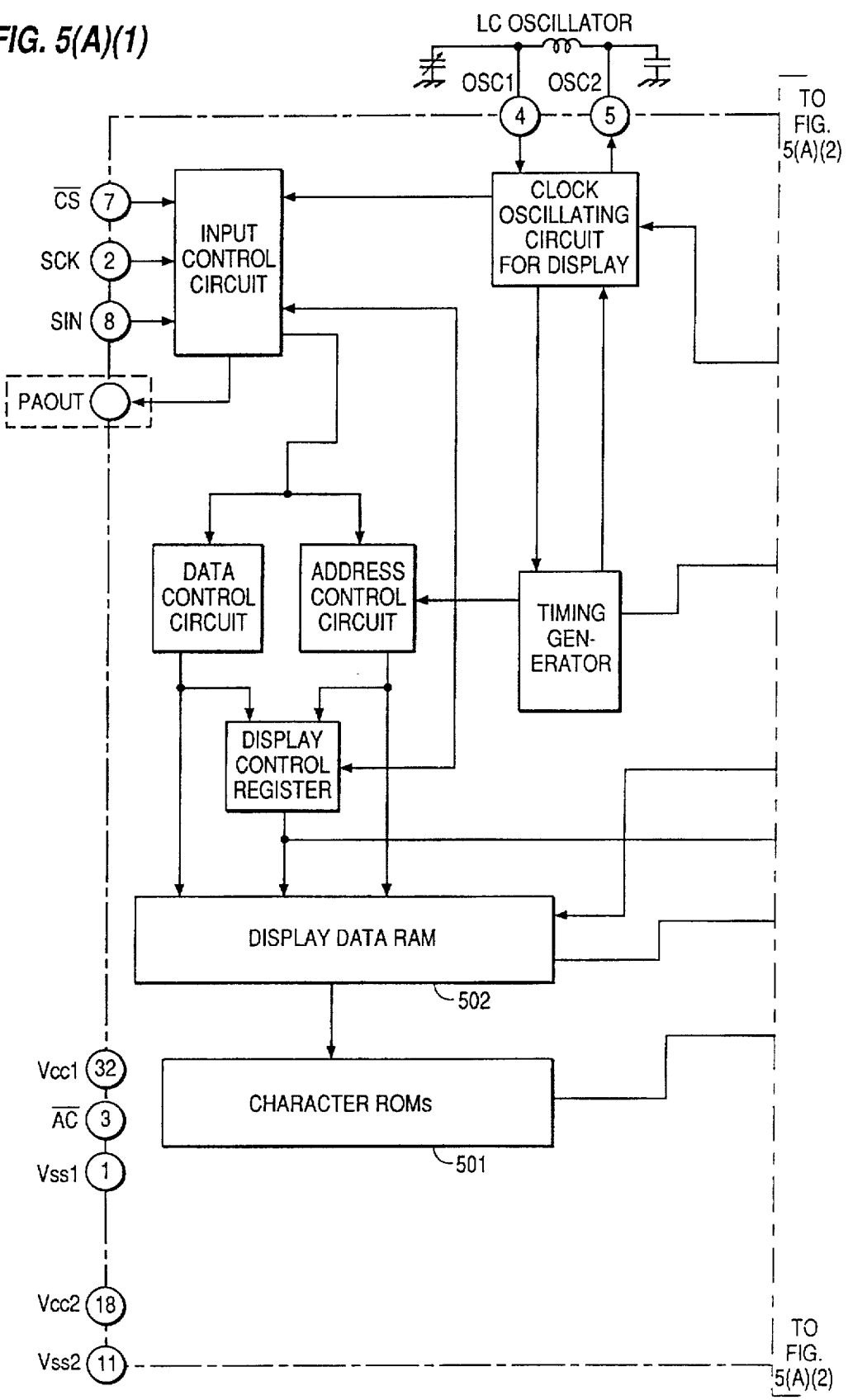
FIG. 5(A)(1)

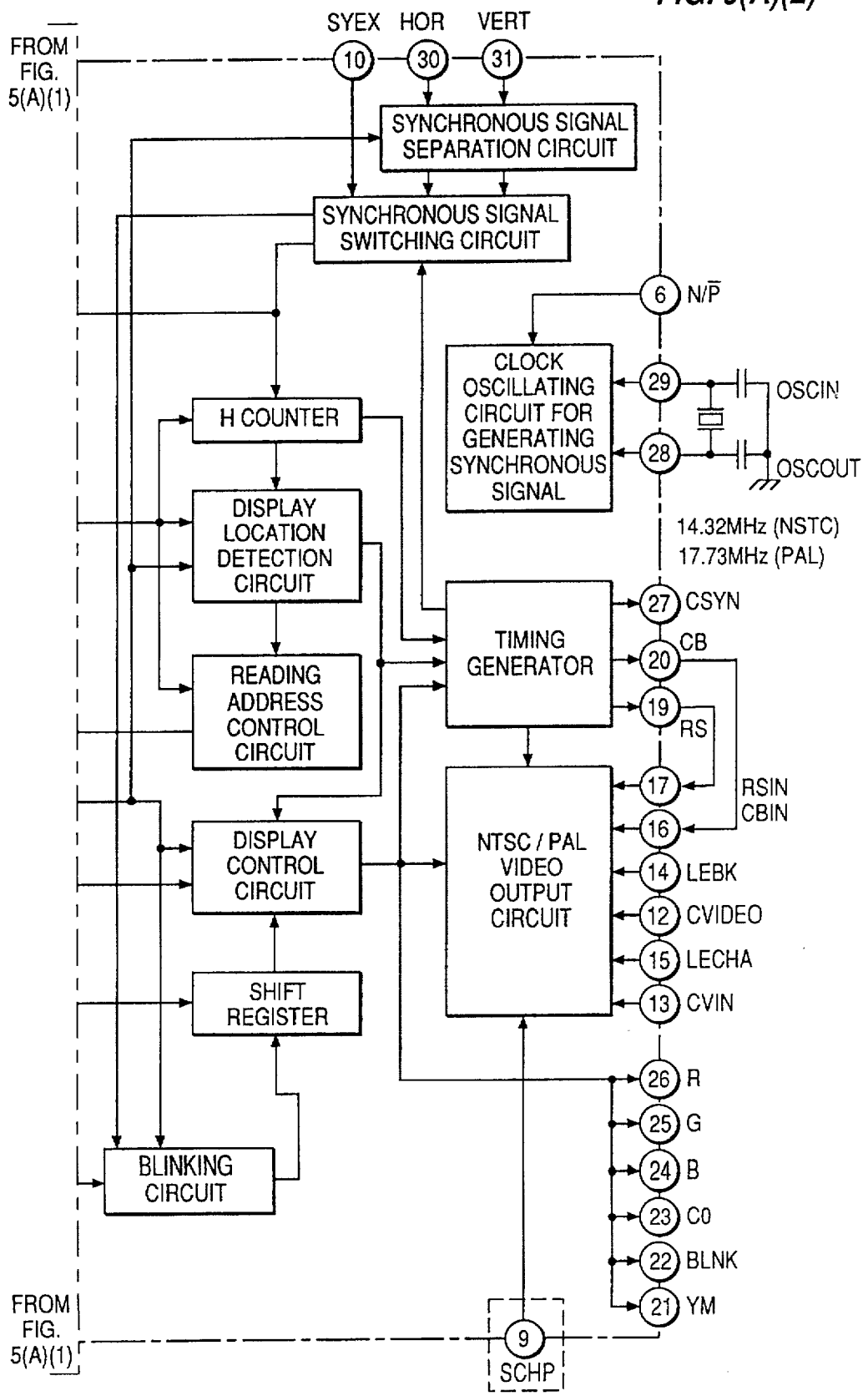
FIG. 5(A)(2)

FIG. 5B

| CHARACTER COLOR BITS | BLINKING BIT | CHARACTER CODE |
|---|---|---|

FIG. 6A

| DISPLAY NUMBER | SCREEN NUMBER | LAST SCREEN FLAG | SEQUENCE NUMBER | CHARACTERS |
|---|---|---|---|---|

FIG. 6B

| ID | ON SCREEN ALERT DATA | DISPLAY NUMBER | BACKGROUND COLOR | TUNING DATA | MESSAGE EXPIRATION | ADDRESS DATA |
|---|---|---|---|---|---|---|

*FIG. 5C*

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 | 240 |

FIG. 8(A)

MESSAGE TABLE

| MSG. NUM. | SIZE | A | B | C | D | ... | | | | |
|---|---|---|---|---|---|---|---|---|---|---|
| 1 | 826 | | | | | | | | | |
| 2 | 260 | | | | | | | | | |
| 3 | | | | | | | | | | |
| 4 | | | | | | | | | | |
| 5 | | | | | | | | | | |
| ... | | | | | | | | | | |
| N | | | | | | | | | | |

MESSAGE CONTROL DATA

FIG. 8(B)

MESSAGE TEXT TABLE

| MSG. NUM. | PAGE NUM. | LAST PAGE | PAGE TEXT |
|---|---|---|---|
| 1 | 1 | 3 | MESSAGE 1 PAGE 1 |
| 1 | 2 | 3 | MESSAGE 1 PAGE 2 |
| 1 | 3 | 3 | MESSAGE 1 PAGE 3 |
| 2 | 1 | 2 | MESSAGE 2 PAGE 1 |
| 2 | 2 | 2 | MESSAGE 2 PAGE 2 |
| ... | | | |
| N | | | |

FIG. 8(C)

MESSAGE SCHEDULE TABLE

| MSG. NUM. | START TIME | END TIME | CON- VERTER GRP. CODE | DIG. ADDR. CODE | HE CODE | MSG. TYPE | STATUS | DISP. SEQ. NUM. | DISP. VALID NUM. | DISP. PERIOD | MSG. DISP. NUM. | SCRAMBLER ADDRESS |
|---|---|---|---|---|---|---|---|---|---|---|---|---|
| 1 | 10:00:00 | 15:00:00 | X | 862791 | 01 | | ACTIVE | 1 | | 5 | | 5500 |
| 2 | | | | | | | | | | | | |
| 3 | | | | | | | | | | | | |
| 4 | | | | | | | | | | | | |
| 5 | | | | | | | | | | | | |
| ...... | | | | | | | | | | | | |
| N | | | | | | | | | | | | |

FIG. 9(A)

| DIGITAL ADDR. | MESSAGE NUM. |
|---|---|
| 162485 | 3 |
| 862791 | 1 |
| 440183 | 5 |
| ⋮ | ⋮ |
|  |  |

CVT MESSAGE TABLE

FIG. 9(B)

| MESSAGE NUM. | CONVERTER GROUP CODE | HE CODE |
|---|---|---|
| 1 | X | 01 |
| 2 | X | 01 |
| 3 | R | 01 |
| 4 | Q | 01 |
| ⋮ | ⋮ | ⋮ |
|  |  |  |

MESSAGE CONVERTER GROUP TABLE

FIG. 9(C)

| CONVERTER GROUP CODE | DIGITAL ADDR. | HE CODE |
|---|---|---|
| X | 162485 | 01 |
| R | 440183 | 01 |
| Q | 226167 | 01 |
| ⋮ | | |
| | | |

CVT_CVT GROUP TABLE

FIG. 9(D)

| CONVERTER GROUP CODE | HE CODE | DESCR. | STATUS | TYPE | LAST BUILD TIME | SELECTION CRITERIA | SELECTION TYPE |
|---|---|---|---|---|---|---|---|
| X | 01 | | BUILT | | | HE#=01 | |
| R | 01 | | | | | | |
| Q | 01 | | | | | | |
| ⋮ | | | | | | | |
| | | | | | | | |

CONVERTER GROUP TABLE

FIG. 10(A)

| CON-VERTER SERIAL CODE | DIGITAL ADDR. | HE CODE | FEATURES | SERVICE CODES |
|---|---|---|---|---|
| 12345 | 162485 | 01 | | HB, BA |
| | | | | |
| | | | | |
| | | | | |
| | | | | |
| | | | | |

CONVERTER TABLE

FIG. 10(B)

| SCRAMBLER ADDRESS | HE CODE | MEMORY SIZE |
|---|---|---|
| 5500 | 01 | 126K |
| | | |
| | | |
| | | |
| | | |
| | | |

SCRAMBLER TABLE

FIG. 11

CHARACTER CODES
(2 BYTES ALPHANUMERIC) - THIS FIELD IS USED TO SPECIFY ONE
CHARACTER OF ON-SCREEN TEXT DATA.

| SINGLE CHAR CODE | DEFINITION | SINGLE CHAR CODE | DEFINITION |
|---|---|---|---|
| 00 | ' ', SPACE | 20 | '0' |
| 01 | 'A' | 21 | '1' |
| 02 | 'B' | 22 | '2' |
| 03 | 'C' | 23 | '3' |
| 04 | 'D' | 24 | '4' |
| 05 | 'E' | 25 | '5' |
| 06 | 'F' | 26 | '6' |
| 07 | 'G' | 27 | '7' |
| 08 | 'H' | 28 | '8' |
| 09 | 'I' | 29 | '9' |
| 0A | 'J' | 2F | '£' UK POUND SYM. |
| 0B | 'K' | 30 | '[' LEFT BRACKET |
| 0C | 'L' | 31 | ']' RIGHT BRACKET |
| 0D | 'M' | 32 | '▲' ARROW UP |
| 0E | 'N' | 33 | '▼' ARROW DOWN |
| 0F | 'O' | 34 | '?' QUESTION MARK |
| 10 | 'P' | 35 | '-' DASH |
| 11 | 'Q' | 36 | ':' COLON |
| 12 | 'R' | 37 | '$' DOLLAR |
| 13 | 'S' | 38 | ''' APOSTROPHE |
| 14 | 'T' | 39 | ',' COMMA |
| 15 | 'U' | 3A | '.' PERIOD |
| 16 | 'V' | 3B | '*' ASTERISK |
| 17 | 'W' | 3C | '#' NUMBER |
| 18 | 'X' | 3D | '&' AMPERSAND |
| 19 | 'Y' | 3F | '+' PLUS |
| 1A | 'Z' | FF | END CHARACTER |
| 1E | CURSOR LEFT SYMBOL | | |
| 1F | CURSOR RIGHT SYMBOL | | |

FIG. 12

CHARACTER COMPRESSION CODES

| COMPRESSION CHAR CODE | DEFINITION | COMPRESSION CHAR CODE | DEFINITION |
|---|---|---|---|
| 80 | "SUN" | AB | "EVENT" |
| 81 | "MON" | AC | "THIS " |
| 82 | "TUES" | AD | "CONTROLLED" |
| 83 | "WEDNES" | AE | "-----" |
| 84 | "THURS" | AF | "POWER OUTLET" |
| 85 | "FRI" | B0 | "HAVE " |
| 86 | "SATUR" | B1 | "LENGTH:" |
| 87 | "FAVORITE CHANNEL" | B2 | "PRESS" |
| 88 | "CHANNEL" | B3 | "PLEASE " |
| 89 | "SLEEP TIMER" | B4 | "AUTHORIZED" |
| 8A | "TIMER" | B5 | "REVIEW" |
| 8B | "TURN" | B6 | "VIEW" |
| 8C | "PRESS [MENU] TO EXIT. " | B7 | "ABLE" |
| 8D | "PROGRAM TIMER" | B8 | "PURCHASE " |
| 8E | "PAY-PER-VIEW " | B9 | " IS" |
| 8F | "PARENTAL CONTROL" | BA | " TO " |
| 90 | "CONTROL" | BB | "SWITCHED" |
| 91 | "SET-TOP" | BC | "ALWAYS ON" |
| 92 | "MESSAGE" | BD | "CAN NOW " |
| 93 | "CLEAR " | BE | "NOT " |
| 94 | "PRES [CH▲] OR [CH▼] TO " | BF | "ADD " |
| 95 | "THEN PRESS [SELECT]" | C0 | "A " |
| 96 | "THE " | C1 | "RE" |
| 97 | "PRESS [SELECT]" | C2 | " MORE" |
| 98 | "MINUTE" | C3 | "TIME" |
| 99 | " NUMBER" | C4 | " SHOW" |
| 9A | "PLEASE ENTER" | C5 | "DISPLAY" |
| 9B | "PARENTALLY CONTROLLED" | C6 | "STATUS" |
| 9C | "CHANGE " | C7 | "IS" |
| 9D | "REMOVE " | C8 | "NEXT, " |
| 9E | "CURRENTLY " | C9 | "OFF" |
| 9F | "ENTER" | CA | "ON" |
| A0 | " PROGRAM" | CB | "IN" |
| A1 | "YOU " | CC | "PUT " |
| A2 | " YOUR " | CD | " FOR" |
| A3 | "A PROGRAM" | CE | "OR" |
| A4 | " SET" | CF | "ED" |
| A5 | "DAY" | D0 | " CHANNEL" |
| A6 | "1ST " | D1 | "ER" |
| A7 | "2ND " | D2 | "E " |
| A8 | "THANK YOU " | D3 | "Y " |
| A9 | "EVERY" | D4 | ", " |
| AA | "START" | D5 | "T " |

FIG. 14

Message Number [1234]

Description [A message]
Size of Line 1 [Normal]
Blank Screen Before Display [Yes]
Message Alert [No]
Background Color [Low intensity Blue]

| Headend | Assigned to | Status | Start Date | End Date |
|---------|-------------|--------|------------|----------|
|         |             |        |            |          |

[Edit Text] [Assign Message] [Schedule Message]
[Save] [Exit] [Next Message] [Copy] [Delete] [Print] [Help]

FIG. 15

| Headend Code | 01 | Message Number | 1234 |

Serial Numbers

Available Serial Number

Assigned Serial Number

AA1234567

Add ▷

Remove ◁

Save  Exit    Print  Help

Headend Code [01]    Group Number [22]

Description [           ]

Characteristic
- Term Status
- Serial Number
- Digital Address
- Term Feature
- Service Code

Relationship
- Equal To
- Not Equal To
- Greater Than
- Less Than
- Greater Than or Equal To
- Less Than or Equal To

Operator
- And
- Or
- (
- )

Put in this On-Screen Group all of the Home Terminals which have

^

| Save | Exit | Next Group | List Messages | Delete Group | Clear Screen | Print | Help |

SYSTEM AND METHOD FOR REMOTELY SELECTING SUBSCRIBERS AND CONTROLLING MESSAGES TO SUBSCRIBERS IN A CABLE TELEVISION SYSTEM

This application is a continuation of application Ser. No. 08/018.933, filed Feb. 16, 1993, now abandoned.

This invention is related by subject matter to U.S. application Ser. Nos. and (filed Feb. 16, 1993), entitled "Method of Selecting Cable Television Converter Groups" and Addressed Messaging in a Cable Television System" (filed Apr. 22, 1993) respectively of the same inventors.

BACKGROUND OF THE INVENTION

1. Technical Field

This invention relates generally to a subscription cable television system, and, more particularly, to a method and apparatus for remotely selecting a group of one or more cable television subscribers based on information in a database and transmitting messages to them for display on their television receivers.

2. Description of the Relevant Art

The architectures of many cable television systems have evolved into one where a system control computer performs real-time processing associated with the programming of cable channels (i.e., controlling the hardware and sending commands to subscriber terminals), while a separate billing computer, which may operate in a "batch" mode, is used for billing customers based on their levels of service and special events such as pay-per-view events. Two databases are typically used to store different information about the subscribers. A first database, residing on the billing computer, may store subscriber information relating to subscriber addresses, payment schedules, viewing habits, telephone numbers, credit histories, and other extensive data not necessary for real-time control of services to the cable subscriber's home terminal. A second, much more limited database, may reside on the system control computer and contain basic information suitable for controlling each subscriber terminal and the sophisticated hardware devices which comprise a cable transmission system. The two computers may be linked, for example, by a phone line to transmit authorization information between them (such as authorizing a particular subscriber for a pay-per-view event based on a credit card payment registered in the billing computer). Moreover, depending on the size of the subscription cable system, there may be multiple billing computers associated with a single system control computer. The billing computers, which may belong to one or more billing vendors, may use different billing software and have differing database structures.

Having two or more separate databases may be convenient in that simultaneous access to the two databases has heretofore been unnecessary (since billing operations are run infrequently) and, as long as periodic updates are made to both databases to keep them relatively consistent, the billing operations can be performed by a different vendor and under different conditions than the real-time control of the cable transmission hardware. With the advent of a capability to send on-screen messages to cable subscribers, however, this approach results in several disadvantages.

First, because subscriber data is segregated between a billing database and a real-time control database tailored to particular subscriber apparatus, there is no suitable method for correlating data in the billing computer database with that of the system control computer database. For example, although the billing computer may have data relating to subscriber addresses (and, by implication, geographic zone information), dates of birth, credit histories, purchasing patterns as they relate to cable shows, and other data that would be useful for marketing purposes, there is no easy way of correlating this information with particular subscriber apparatus and other parameters necessary for transmitting a "targeted" message at a select group of subscribers. Thus, a vendor may wish to send a specialized advertising message to all cable viewers who have subscribed to the Disney channel and who live in a particular area. With current technology, this has been impossible to achieve.

Second, combining both databases and storing a copy on the billing computer and system control computer would not be feasible due to severe constraints placed on the system control computer. For example, the billing computer database may be several times larger than the system control computer database, and due to the system control computer requirement to handle transactions on a real-time basis, accessing the much larger database would unacceptably slow down its function, defeating the intended purpose of combining the data.

Third, due to low bandwidth availability over the link between the billing computer and system control computer (e.g., 9600 baud), sending large quantities of data across this interface may take an unacceptably long time if performed frequently.

Fourth, in the absence of a standardized method of selecting subscribers and creating on-screen messages for display to the selected subscribers between a billing computer and a system control computer, connecting multiple billing computers (each with a possibly different database organization) with a system control computer would not be feasible due to variations in the organization of the databases.

Consequently, there remains in the art of subscription television services a need for the ability to remotely select subscribers based on a correlation of subscriber data in a billing computer database and a system control database so that on-screen messages can be sent to selected subscribers.

SUMMARY OF THE INVENTION

Accordingly, it is an object of the present invention to overcome the difficulties of present cable television systems with regard to selecting subscribers for the purpose of transmitting messages without departing from the existing hardware architecture of cable subscription systems.

It is a further object of the present invention to define a compact method of remotely specifying, using a "selection criteria language", cable subscribers from a billing computer such that a minimum amount of data transmission is required between the billing computer and a system control computer.

It is a further object of the present invention to allow data from a billing computer database to be easily correlated with a system control computer database such that specific subscribers may be selected for messages to be sent based on criteria stored in the billing computer database (e.g., credit histories, subscriber residence location, age, etc.), the system control computer database (e.g., digital address of subscriber terminal, service level such as HBO, Disney, Remote Control, etc.), or a combination of the two.

It is a further object of the present invention to provide a method for remotely creating an on-screen message and selecting a group of recipients for the on-screen message from a billing computer by selecting a group of subscribers from a billing computer, remotely creating a message from the billing computer, and transmitting the group of subscribers and the message to the system control computer for subsequent transmission to the selected subscribers.

It is a further object of the present invention to provide a system for remotely selecting subscribers and transmitting an on-screen message to a group of one or more subscribers, comprising a billing computer having a subscriber database, a system control computer having a separate system control database and coupled to the billing computer, a means for remotely selecting subscribers by referencing data fields stored in the system control database, cable transmission means for transmitting the message to individually addressable subscriber terminals, and subscriber terminal apparatus for receiving, decoding and displaying the message on a television coupled to the subscriber terminal apparatus.

It is a further object of the present invention to provide a method for remotely creating an on-screen message and selecting a group of recipients for the on-screen message from a billing computer, comprising the steps of selecting, through the use of a selection criteria statement, a group of subscribers from the billing computer based on criteria stored in a database residing on a system control computer coupled to the billing computer to create a selection criteria group, creating an on-screen message from the billing computer intended for display to subscribers who are members of the selection criteria group, and transmitting the selection criteria group and the on-screen message to the system control computer.

It is a further object of the present invention to provide a system control computer apparatus for controlling the transmission of addressed messages to individuals or groups of subscribers of a subscription television system comprising a billing computer interface means for receiving messages and a subscriber group selection from a billing computer; a database storage means for storing subscriber data and messages; a group management means, coupled to said billing computer interface means and said database storage means, for convening said subscriber group selection into individually addressable subscriber terminals; a system event scheduler means for scheduling said messages; and a device management means, coupled to and responsive to said system event scheduler means, for transmitting messages to said individually addressable subscriber terminals.

Other objects and features of the present invention are described herein in connection with the following brief and detailed descriptions of the accompanying drawings.

BRIEF DESCRIPTION OF THE DRAWINGS

FIG. 4(A) is a table showing a proposed data transaction packet scheme for transmitting data via each of three data channels: in-band video data, in-band audio data, and out-of-band data.

FIG. 5(A) is a block diagram of the on-screen display control circuit 406 of FIG. 4.

FIG. 5(B) illustrates memory locations of RAM of the on-screen display of FIG. 4.

FIG. 5(C) illustrates the configuration of an on-screen display comprising, for example, characters.

FIG. 6A illustrates a message transaction to a subscriber terminal.

FIG. 6B illustrates a message definition transaction to a subscriber terminal for defining control characteristics for a particular message.

FIGS. 8(A), 8(B) and 8(C) illustrate the message table, message text table and message schedule table database structures, respectively, which are stored in system control computer 120 in accordance with the present invention.

FIGS. 9(A), 9(B), 9(C), and 9(D) illustrate the CVT message table, message converter group table, CVT_CVT group table and converter group table database structures, respectively, which are stored in system control computer 120 in accordance with the present invention.

FIGS. 10(A) and 10(B) illustrate the converter table and scrambler table database structures, respectively, which are stored in system control computer 120 in accordance with the present invention.

FIG. 11 shows a preferred set of character codes for subscriber terminals in accordance with the present invention.

FIG. 12 shows a preferred set of character compression codes for subscriber terminals in accordance with the present invention.

FIGS. 13 to 19 show a set of preferred user interface screen layouts which may be used to define and schedule messages, and define groups in accordance with the present invention.

DETAILED DESCRIPTION OF THE PREFERRED EMBODIMENT SYSTEM OVERVIEW

Figure 1:
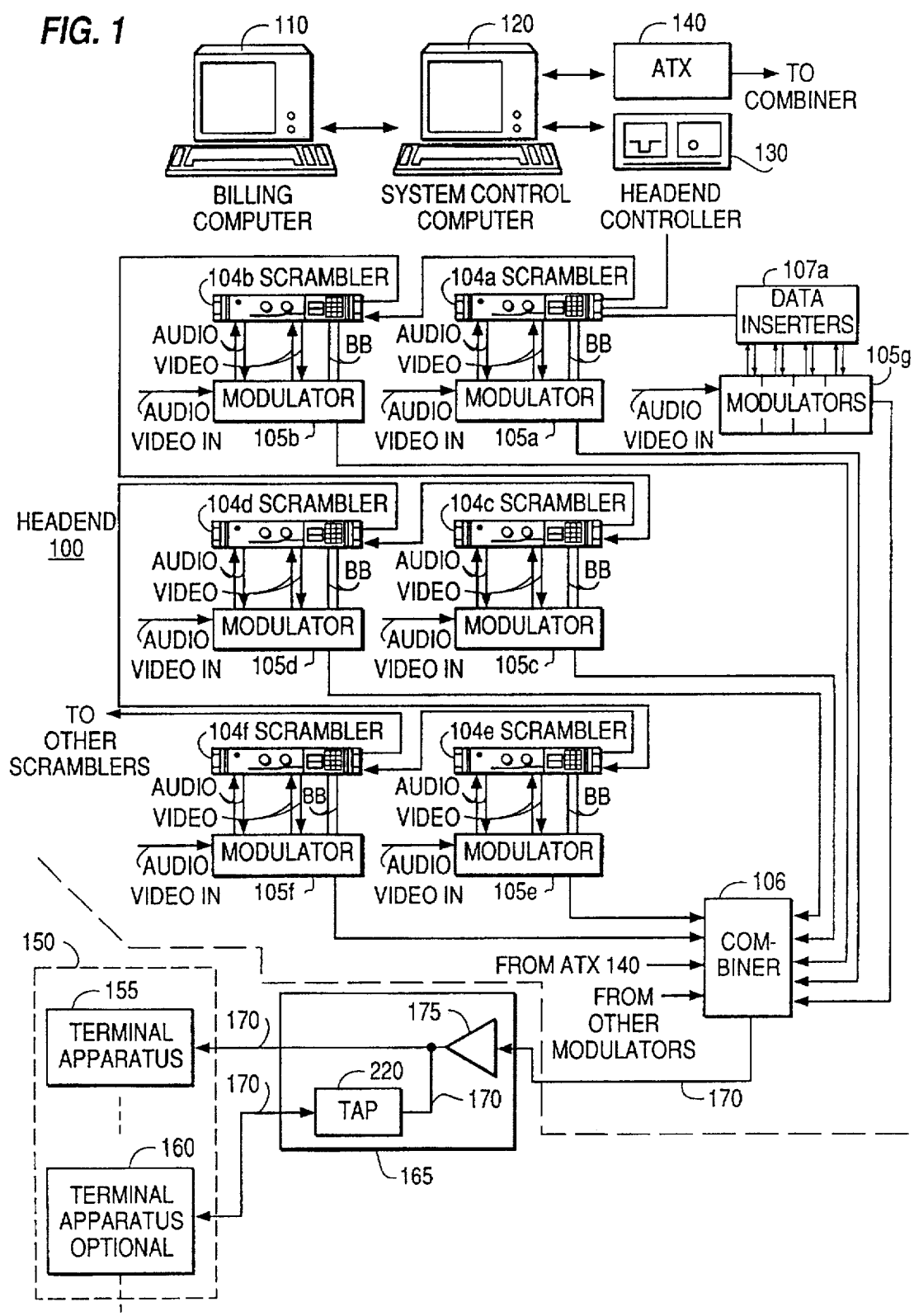
FIG. 1 is a block schematic diagram of a cable television system comprising a headend 100, signal distribution apparatus 165, subscriber terminal apparatus 150, the headend including a system control computer 120 according to the principles of the present invention.

FIG. 1 is a block diagram of a subscription television system in which the present invention may be implemented. Such a system may transmit messages to a plurality of subscribers through in-band transmission means, out-of-band transmission means, or a combination of the two. Details of in-band and out-of-band transmission means are provided herein, and are also described in commonly assigned United States patent application Ser. No. 07/983,766, filed on Dec. 1, 1992, incorporated herein by reference. Details of formatting message data for transmission to subscribers are provided herein, and are also described in commonly assigned United States patent application Ser. No. 07/800,241, filed on Nov. 29, 1991, incorporated herein by reference.

In FIG. 1, billing computer 110 includes a subscriber database and generates a monthly bill for the subscribers in the system based on level of service and any pay-per-view and impulse pay-per-view purchases. Billing computer 110 comprises a data processing computer, such as a personal computer with monitor and keyboard, running specialized billing and subscriber database software, for example a software package offered by CABLEDATA, Inc. System control computer 120 may also be a personal computer and, according to the principles of the present invention, may be a Scientific-Atlanta, Inc. System Manager 10 data processor. The System Manager 10 data processor may comprise, for example, an IBM Model 90 equipped with a 200 megabyte hard drive running the UNIX® operating system with 32 megabytes of RAM. In accordance with the principles of the present invention, however, system control computer 120 need not be a System Manager 10 processor, but could instead comprise another data processing computer known in the art. System control computer 120 may include a monitor on which screens are displayed to the user (as discussed herein in reference to FIGS. 13 through 19), and data entry means which allows a user to define messages, groups, message schedules and other data in accordance with the principles of the present invention.

System control computer 120 is interfaced to billing computer 110 over, for example, a 9600 baud telephone line. System control computer 120 receives transactions such as authorized transactions (for example, authorization for premium channels or pay-per-view credits) from billing computer 110 and formats and forwards transactions to headend controller 130 and addressable transmitter (ATX) 140. A billing computer interface exists between billing computer 110 and system control computer 120, implemented over the hardware link between the two according to a protocol described in detail herein. Such an interface allows groups of subscriber terminals (also referred to as converters herein) to be created and addressed remotely and with more flexibility than is possible using system control computer 120 alone. While system control computer 120 may contain a relational database (such as INFORMIX®, available from INFORMIX Software, Inc.) to store subscriber data with regard to particular cable programming features and subscriber terminal capabilities, billing computer 110 may have a more comprehensive database containing demographic and other data such as subscriber addresses, telephone numbers, names and ages of members in each household and their dates of birth, credit ratings, approximate income levels, spending habits, viewing habits, and credit card numbers to name a few.

While the following description of the present invention assumes that both out-of-band and in-band addressed data transmission is employed to transmit messages to individual subscribers or groups of subscribers in accordance with the present invention, one or the other, or yet a different channel may be employed within the scope of the present invention.

System control computer 120 also generates system set-up parameters such as scrambled channels. System control computer 120 configures tuning frequencies of the channels provided to the subscribers and controls on-screen display features as described in greater detail below. A system control computer device interface (not shown) is responsible for gathering and appropriately routing the data leaving system control computer 120 as further described with reference to FIG. 7 ("device manager") herein. Out-of-band data is sent to addressable transmitter 140, while in-band data is sent to headend controller 130.

Addressable transmitter 140 transmits data to out-of-band subscriber terminals via a dedicated FM data channel such as a 108.2 megahertz data channel in the cable television distribution system. This channel, known as the data carrier, is used to transmit both addressable commands intended for a particular out-of-band subscriber terminal and global commands intended for all out-of-band subscriber terminals in the system. Out-of-band subscriber terminals 150 contain a receiver configured to receive commands sent over this data channel. Unlike in-band transactions, out-of-band subscriber terminals receive data over this channel regardless of the channel the subscriber terminal is tuned to.

Headend controller 130 is coupled to system control computer 120 and formats system control computer transactions for scramblers 104a–104f. Headend controller 130 stores all transactions and has the ability to perform continuous refreshes. The requirement to constantly, repetitively and efficiently transmit in-band messages arises since there is no permanently tuned data channel for in-band data transactions. Thus, all information flow to the in-band subscriber terminals is subject to the indeterminate availability of a data path to the in-band subscriber terminals.

Scramblers 104a–104f are coupled to headend controller 130 and may be used to selectively scramble television signals for improved security in a subscription television system that is equipped with appropriate descramblers. The outputs of scramblers 104a–104f are respectively supplied to modulators 105a–105f. The outputs of modulators 105a–105f are supplied to combiner 106 which outputs a television signal for distribution over distribution system 170 to both in-band subscriber terminals and out-of-band subscriber terminals 150. Data from scramblers, e.g., 104a, can also be provided to data inserter 107 for the transmission of in-band data on non-scrambled channels. Further details of transmitting in-band and out-of-band data using the system of FIG. 1 can be found in commonly assigned United States patent application Ser. No. 07/983,766, filed on Dec. 1, 1992.

Figure 2:
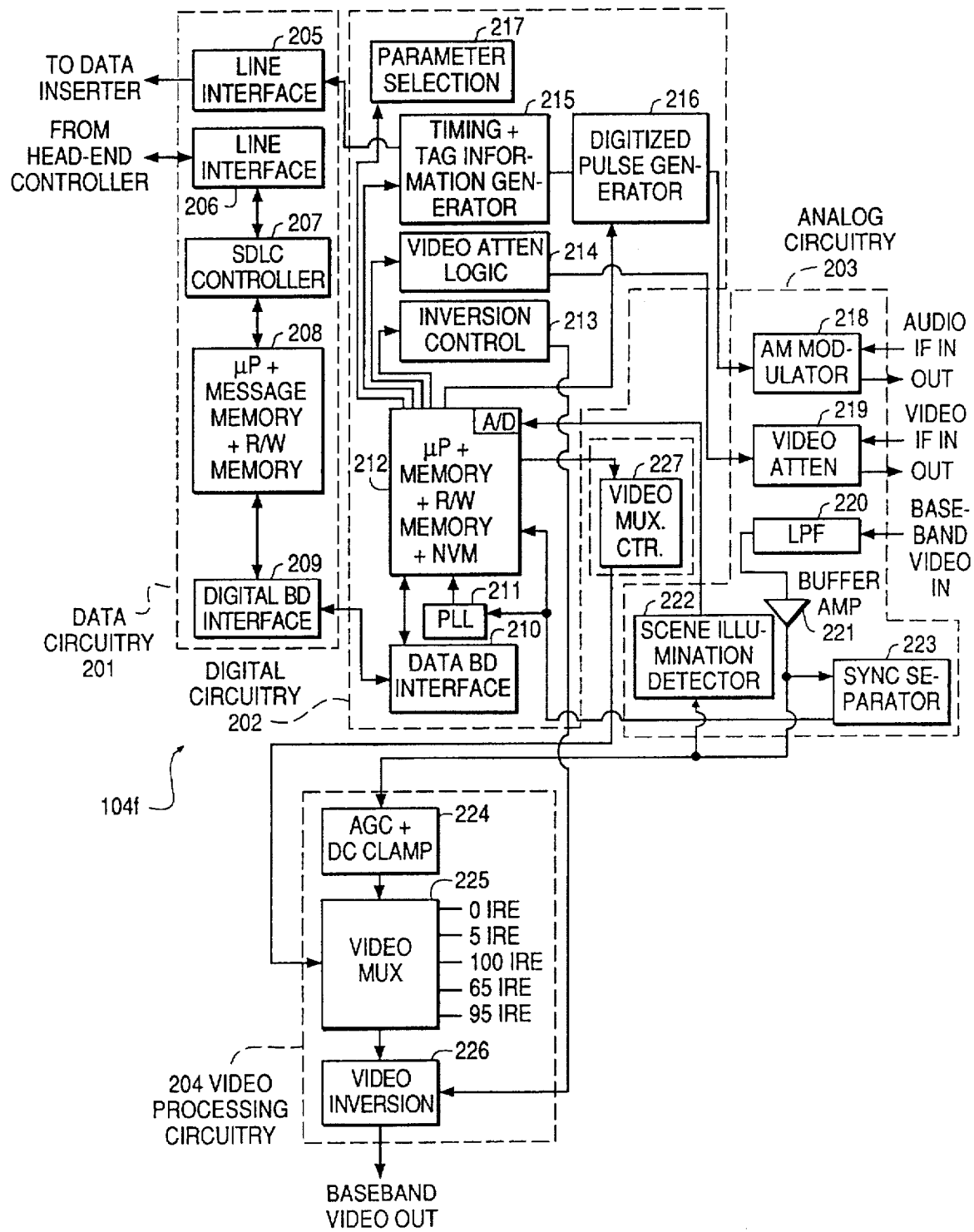
FIG. 2 is a block schematic diagram of a television signal scrambler such as apparatus 104a shown in FIG. 1.

FIG. 2 is a block diagram of a scrambler apparatus such as that of 104a shown in FIG. 1. Scrambler 104a receives message channel data from headend controller 130. The message channel data includes character information for display screens which may be addressed to one or more subscriber terminals for display on an associated television. Scrambler 104a includes data circuitry 201, digital circuitry 202, analog circuitry 203, and video processing circuitry 204. Data circuitry 201 includes line interfaces 205 and 206, synchronous data link control (SDLC) 207, microprocessor 208, and digital circuit interface 209. SDLC 207 controls communication via line interface 206 between scrambler 104a and headend controller 130. Microprocessor 208 receives and processes information from SDLC 207. Information such as message information is stored in non-volatile message memory of microprocessor 208. To ensure sufficient memory for message data, there is preferably at least 128K of non-volatile message memory. Read/write memory of microprocessor 208 stores temporary information. Interface circuit 209 interfaces the data circuitry 201 to the digital circuitry 202.

Digital circuitry 202 includes interface circuit 210, phase locked loop 211, microprocessor 212, inversion control circuit 213, video attenuation logic 214, timing and tag information generator 215, digitized pulse generator 216, and parameter selection circuit 217. Interface circuit 210 interfaces digital circuitry 202 with data circuitry 201. Microprocessor 212 controls all essential functions and features of scrambler 104a. Microprocessor 212 extracts and processes message data from the data circuitry 201 and controls the scrambling modes of the system. Digitized pulse generator 216 generates the specific pulses placed on the sound carrier via the analog circuitry under the control of microprocessor 212. These pulses represent authorization and control information, descrambling information including timing pulses, and message information. Microprocessor 212 is also coupled to parameter selection circuitry 217 which may be a front panel display and keyboard which permits an operator to select various modes of operation, e.g., scrambling.

Analog circuitry 203 includes AM modulator 218, video attenuation circuitry 219, low pass filter 220, buffer amplifier 221, scene illumination detector 222, and synchronization separator 223. AM modulator 218 modulates the pulses from pulse generator 216 onto an audio IF signal from modulator 105a and outputs the modulated signal to modulator 105a. Video attenuation circuitry 219 selectively provides sync suppression type scrambling and attenuates a video IF signal from modulator 105a under the control of video attenuation logic 214.

Baseband video input is filtered with low pass filter 220 which may be a sharp cut-off phase equalized low pass filter. Low pass filter 220 removes high frequency noise that can interfere with the baseband video. After filtering, the video is amplified back to its original level by video amplifier 221. Sync separator 223 extracts synchronization information which is then sent to microprocessor 212 to provide timing information such as composite and vertical sync and odd/even field indication. Scene illumination detector 222 determines the average luminance level of a scene, which level is supplied to an A/D converter of microprocessor 212. Microprocessor 212 uses this luminance information to detect scene changes in order to determine when scrambling modes may optimally be changed. The composite synchronization signal is supplied to the input of phase locked loop (PLL) 211. Phase locked loop 211 locks the system clock to the line rate.

The baseband video signal from amplifier 221 is also supplied to video processing circuitry 204. Video processing circuitry 204 includes automatic gain control (AGC) and DC clamping circuitry 224, video multiplexer 225, and video inversion circuit 226. The AGC of circuit 224 adjusts the incoming signal to a predetermined value such as 1 V peak to peak. The DC clamping of circuitry 224 forces the bottom of the sync tip to be at ground. The output of circuitry 224 is supplied to a video multiplexer circuit 225. The details of split synchronization circuitry is discussed in detail in commonly assigned U.S. Pat. No. 4,924,498, incorporated herein by reference. The output of video multiplexer circuitry 225 is provided to inverting circuitry 226 for inverting the baseband video about an inversion axis. Inversion is controlled in accordance with signals from inversion control circuit 213.

Scrambler 104b may receive scroll channel data from headend controller 130. The scroll channel data includes character information which defines barker screens which have been designed by the system operator on system control computer 120. Scramblers 104a and 104b respectively store message channel data and scroll channel data and continuously output the data on the corresponding scroll and message channels. Since the scroll channel data and the message channel data preferably define a plurality of barker and message screens, the stored data is output in a loop. Thus, if there are 8 barker screens, the information for the first screen is followed by the information for the second screen and so on. When the information for the eighth screen is sent, it is followed by the information for the first screen. A similar loop is established for the message channel data. Details of scramblers 104a–104f may be found in the above-identified U.S. Pat. No. 5,058,160, incorporated herein by reference.

Figure 3:
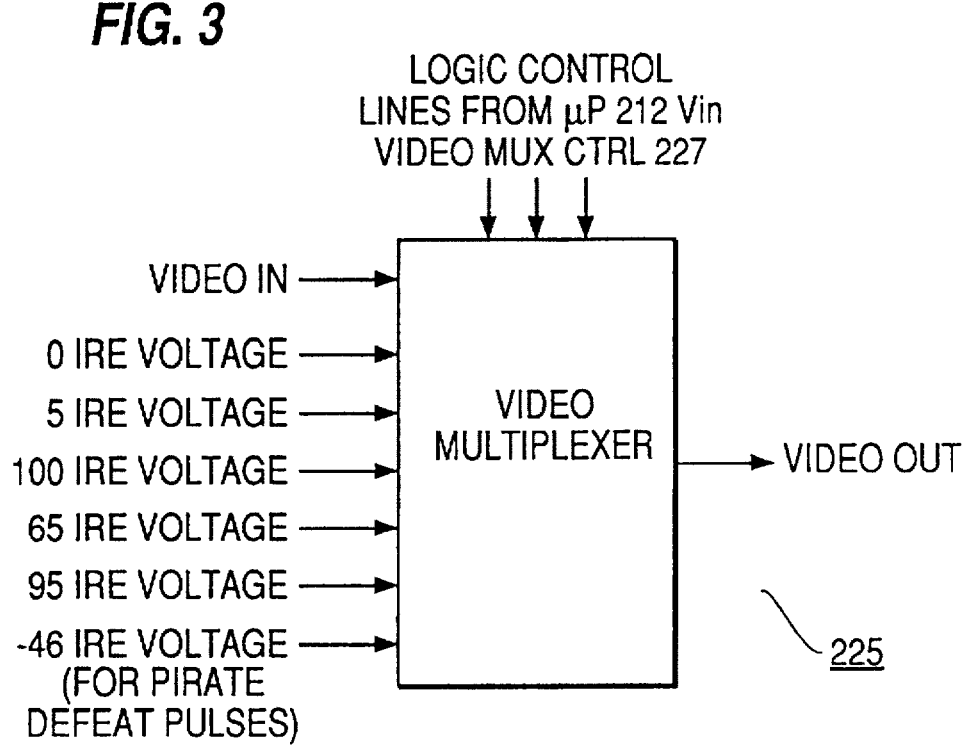
FIG. 3 is a block schematic diagram of an in-band video data inserter which may comprise a portion of a scrambler or a television channel data inserter of the headend of FIG. 1.

FIG. 3 provides further details of video multiplexer 225. Video multiplexer 225 may comprise an element of scrambler 104a, data inserter 107a or another element of a cable television headend including but not limited to a modulator or signal processor. Logic control lines are provided from microprocessor 212 via video multiplexer controller 227 for controlling selection of one of a plurality of input signals comprising a baseband video input signal and several predetermined input IRE voltage levels. Further details of this video multiplexer may be found in commonly assigned United States patent application Ser. No. 07/983,766, filed on Dec. 1, 1992. Further details of tuning data channels in a subscription television system having in-band data transmission to transmit messages to subscribers can be found in commonly assigned United States patent application Ser. No. 07/800,241, filed on Nov. 29, 1991, incorporated herein by reference. Reference should also be made to commonly assigned United States patent application Ser. No. 07/800,836, filed on Nov. 29, 1991 for details of message channel data streams, hereby incorporated by reference.

SUBSCRIBER TERMINAL APPARATUS AND MESSAGE DISPLAY METHOD

Figure 4:
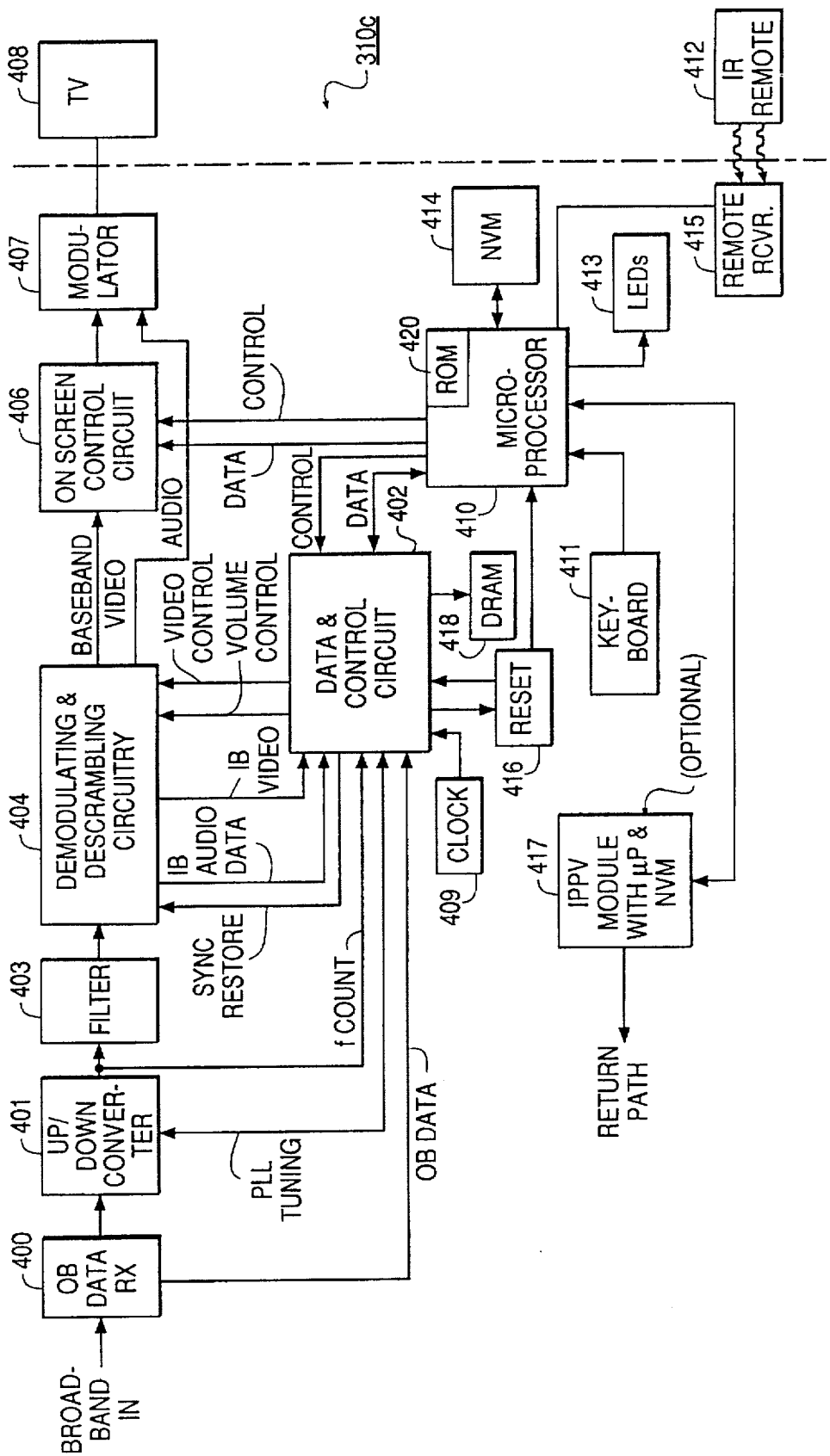
FIG. 4 is a block schematic diagram of an in-band/out-of-band subscriber terminal apparatus such as apparatus 150 of FIG. 1, including on screen display control circuit 406.

FIG. 4 is a block diagram illustrating the components of a subscriber terminal 150 which can handle both in-band (IB) and out-of-band (OB) data. Examples of subscriber terminal 150 include Scientific-Atlanta models 8570, 8590, 8600 and 8601 Set Top Terminals. Although the subscriber terminal is described below as a baseband subscriber terminal, it will be apparent that other subscriber terminals such as RF subscriber terminals may be utilized. The signal from distribution system 165 is supplied to up/down converter 401. Up/down converter 401 uses a phase locked loop under the control of data and control circuit 402 to convert a selected RF input signal to a 4.5 megahertz signal. Filter 403 such as a SAW filter filters the signal. Demodulating and descrambling circuitry 404 demodulates and descrambles the filtered signal under the control of data and control circuit 402. Demodulating and descrambling circuitry 404 also performs pulse detection to recover the data modulated onto the audio carrier. The data is supplied to data and control circuit 402. Volume control of the audio is performed by demodulating and descrambling circuitry 404 under the control of data and control circuit 402 and microprocessor 410 as described in U.S. Pat. No. 5,054,071, incorporated herein by reference.

The output of demodulating and descrambling circuitry 404 is an unscrambled baseband video signal which is supplied to on-screen display control circuit 406. On-screen display control circuit 406 is preferably a Mitsubishi M50556 on-screen display controller. On-screen display control circuit 406 selectively generates on-screen character displays in place of or overlaid on the video signal. Modulator 407 converts the signal containing the video, audio, and/or characters from display control 406 on channels 2, 3 or 4 which is supplied to television 408.

Microprocessor 410 controls the overall operation of the subscriber terminal. Keyboard 411 on a front panel generates subscriber supplied signals for channel tuning, volume level, and the like which are supplied to microprocessor 410. Remote receiver 415 receives commands from IR remote 412, as is well known in the art, and provides the commands to microprocessor 410. Reset circuitry 416 resets microprocessor 410 and/or data and control circuit 402 to ensure proper operation of the system if there have been power failures, power surges, and the like. When keyboard 411 or IR remote 412 is utilized to select a channel, microprocessor 410 instructs data and control circuit 402 to appropriately control up/down converter 401 to tune the selected channel. Data and control circuit 402 utilizes recovered descrambling data to generate appropriate control signals, e.g. inversion control and sync restore signals for descrambling the input television signal. Microprocessor 410 determines whether data and control circuit 402 carries out descrambling on the basis of authorizations downloaded from system control computer 120. LED display 413 displays channel numbers and diagnostics, and may also be used as a message alert for the subscriber. Non-volatile memory 414 stores data, e.g., authorizations and terminal configurations. The subscriber terminal may optionally include IPPV module 417. Module 417 allows the subscriber to authorize his or her subscriber terminal to receive a pay-per-view event, store the data associated with the purchase of that event in non-volatile memory, and transmit the data to the system operator via a telephone return path or an RF return path. The subscriber is billed for the purchased events.

FIG. 4(A) shows a table with data transaction formats for in-band video, in-band audio and out-of-band data transmission. The depicted formats are exemplary only and may be modified as appropriate for particular data transmission requirements and transactions as required. The table depicts a plurality of transaction types, which may be identified as types A-E, by way of example, having different lengths. Transaction type A is of finite length and may be considered to comprise a data packet of a plurality of bytes in a particular sequence and including at least a portion of a data stream which may have a transaction code associated therewith. One exemplary range for transaction type A is 8–24 bytes.

Message data for display on an addressable subscriber terminal may be transmitted to subscribers using these transactions. Depending on the length of the messages, the characteristics of the subscriber terminals and the scramblers and other factors, the particular length and arrangement of message data within these transactions may be varied to suit the particular configuration.

A transaction code or operand provides a command or instruction that the subscriber terminal (or terminals) addressed by the transaction is to follow. The depicted data is for operation according to the operand or transaction code. For example, the data may comprise a list of scrambled channels and the operand or transaction code signal the storage of a new list of scrambled channels in terminal memory. As another example, the data may comprise a message containing multiple characters for display on the subscriber's television receiver, in accordance with the subsequent discussion of FIGS. 5 and 6. Error detection and/or correction (or redundant transmission) or other error checking techniques may be utilized to assure data accuracy and reduce bit error rate according to well known techniques, such as a cyclic redundancy check.

A bits high check indicator is shown for in-band audio to solve a problem uncovered with in-band audio data transmission where a timing pulse can create artifacts that can be confused with a data pulse transmitted on the sound carrier. It is suggested that a bits high count be used to alleviate the problem.

A field flag can identify whether the data is in an odd or even field. The field flag is used, most conveniently in in-band audio data transmission to signal differences in the expected transactions between odd and even fields. The scrambling mode can tell the demodulating and descrambling circuit what mode of scrambling has been applied to the tuned channel. Other data not listed includes facsimile, teletext, a second captioning language or captioning data, program channel guide and other new service data.

If data transaction type A has a length of M bytes, then, a transaction type B may be indicated as having a length of N bytes. Transaction type B is a longer transaction, for example, for identifying a scrambled channel list. It may be conveniently related to transaction type A by a factor, for example, 1.5–2. As shown, Transaction Type B has a length of, for example, 12–36 bytes.

Still longer transaction may be Type C having a length 2–4.5 times the length of Transaction Type B. These transaction may involve even longer streams of data such as channel tuning data.

Transaction Type D may be the equivalent of three Type A transactions or two Type B transaction. On the other hand, Transaction Type D may have only one transaction code despite its length. For example, transaction type D may signal the storage of a channel program guide for display.

Still longer transaction codes may be contemplated for other services such as Type E and so on. These transactions will have predetermined data format and may be the equivalent of multiples of Type A and/or Type B transactions. The relationship among transaction types may be thus defined. If a Type A transaction is said to comprise M bytes and a Type B transaction N bytes, then other types of longer transactions should maintain a commonality determined by M or N and or a factor of two. For example, a Type D transaction may be one long transaction having one transaction code or comprise three Type A transactions or two Type B transactions. The commonality promotes ease of decoding and storage at a subscriber terminal such as terminal 155, especially if the terminal is programmed to look for the several parameters listed in FIG. 6 in predetermined order.

In-band audio data is known in which one bit is transmitted each video line or at a rate of 262 or 263 lines per field less the duration of the vertical synchronizing interval. The bit rate is thus limited in such systems further because certain data slots are reserved for transmittal of certain timing information required for descrambling in a so-called dynamic synch suppression system. The comment in the In-band Audio column for Type E Transaction length reflects this limitation. Yet, in certain embodiments of the present invention, the data rate may be appropriately increased to permit long transactions as long as Type E or even longer.

One purpose of establishing predetermined data formats is to permit ease of decoding and data storage. For example, in-band video data at comparatively high data rates may be decoded and stored in a manner similar to the retrieval of slower in-band audio data or out-of-band data which may be at yet another bit rate.

Moreover, at the headend, the system control computer 120 or headend controller 130 may format a transaction of a type according to FIG. 4(A) so that the transaction, once formatted, need not be reformatted for transmission via any one of the three modes of data transmission described herein: in-band audio, in-band video, or out-of-band data transmission.

FIG. 5(A) is a block diagram of the Mitsubishi M50456 on-screen display control circuit which may, for example, be used for on-screen control circuit 406 of FIG. 4. The on-screen display control includes character ROM 501 for storing a character set. In a preferred embodiment, the following sixty four characters are stored in character ROM 501:

blank
capital letters A–Z
cursor—icon
numbers 0–9
blank volume level
(Pound Sterling)

[ ]?-:$'..*#&+
single character Am Pm Ch

Display RAM 502 is set with data from microprocessor 410 via serial input $S_{IN}$ to generate on screen displays using these sixty four characters. This data may be provided from a number of sources. A first source is message data from message channel data scrambler 104a. A second source is scroll channel data from scroll channel data scrambler 104b. A third source is barker data from ROM of subscriber terminal microprocessor 410. Another source of display information is menu screen information stored in microprocessor ROM 420. The use of such memory screens is described in greater detail in a commonly assigned application entitled "Method and Apparatus for Providing an On-Screen User Interface for a Subscription Television Terminal", Ser. No. 07/800,836, filed Nov. 29, 1991, incorporated herein by reference. Reference may also be made to Scientific Atlanta Publication No. 69P2837 entitled: "Model 8600 Set Top Terminal User's Guide" available from Scientific Atlanta and incorporated herein. Display RAM 502 includes, for example, 240 memory locations for characters to be displayed on television 408.

As shown in FIG. 5B, each memory location includes a blinking bit which determines whether the character is blinking, character color bits which determine the color of the character, and a character code identifying one of the characters stored in ROM 501. The configuration of the on-screen display is shown in FIG. 5C and can be seen to consist of ten rows of twenty four characters each. The information in display RAM 502 determines what appears at each of the screen positions 1-240.

There are three modes of on-screen display. The first mode simply provides the video of a selected channel. The second mode is a video overlay mode in which character information is overlaid on the video of a selected channel. The second mode may be used for example to display time, channel number, and channel identification information when a subscriber tunes to different channels. Channel identification information is described in a commonly assigned copending application entitled "Method and Apparatus for Displaying Channel Identification Information", Ser. No. 07/800,002, filed Nov. 29, 1991, incorporated herein by reference. The third mode is a character mode in which character information is presented on a plain background. This mode is preferably used for messages, for example. It will be apparent that a system operator may utilize either mode to display information to subscribers and the present invention is not limited to with respect to whether information is presented on a solid background or overlaid onto a video signal.

Addressable message transaction transmissions for on-screen display may be forwarded to subscriber terminals in the cable system using, e.g., message scrambler 104a. FIG. 6A illustrates a message transaction transmission for forwarding characters to subscriber terminals. Each message transaction transmission has a display number field associated therewith for identifying a message. In accordance with a present embodiment, the display numbers may range from 0 to 65535, although the invention is not limited in this respect.

Each message may include up to, for example, sixteen screens, each screen having, for example, 240 characters. The characters for each screen may be sent in up to eleven sequenced transactions such as illustrated in FIG. 6A. A sequence number field identifies the transaction transmissions in the sequence of transaction transmissions. The transaction transmissions also include a screen number field for identifying the screens in a sequence of screens and a last screen flag for identifying the last screen in a sequence of screens. If the message is less than 240 characters and message scrambler 104a is configured to transmit variable length messages, fewer transaction transmissions need to be sent to complete the message. The message transaction transmission shown in FIG. 6A may then also include a last transaction flag. As discussed in U.S. Pat. No. 5,058,160, the rate at which transactions are sent is 29 transactions per second. At this transaction rate, slightly more than three seconds is required to send eight 240 character messages over the same message channel. Accordingly, the average wait to start receiving one of these messages is approximately 1.5 seconds.

The message channel utilizes a scrambler configured as scrambler 104a with internal data RAM which stores the message loop from headend controller 130 and retransmits it constantly to the selected subscriber terminals under the control of microprocessor 212. The serial nature of the system is such that as the number of messages in the message loop increases, the response time for a subscriber to receive a message increases. Additional message channels may be utilized to speed up the response time.

The message transaction also permits a system operator to instruct on-screen display control circuit 406 to blank the display on television 408 until the entire screen is received and ready for display. Alternatively, on-screen display control circuit 406 may display the characters as they are received until the message is completed.

A message definition transaction transmission is depicted in FIG. 6B. An ID field identifies the transaction transmission as a message definition. This transaction transmission may indicate to the subscriber terminal that a message has been sent to the subscriber terminal and may be retrieved by the subscriber. The messages may be individually addressed or addressed to members of a group of subscriber terminals defined by the address data. Using a downloaded transaction (i.e., a transaction sent to one or more individually addressed subscriber terminals and stored internally in the subscriber terminals for subsequent use), a subscriber terminal may be assigned to one or more groups. In a preferred embodiment, 64 groups are defined, but the invention is not limited in this respect.

The message definition transaction defines a background color field for setting the background color of the on-screen display and a tuning field which instructs the terminal which channel to tune to receive the message which, in this example, is the message channel. When a subscriber terminal receives a message definition transaction transmission which is addressed to it or to any group of which it is a member, a message alert in accordance with the alert data field may be provided. The subscriber may view the message by use of a menu structure described in a commonly assigned application entitled "Method and Apparatus for Providing an On-Screen User Interface for a Subscription Television Terminal", Ser. No. 07/800,836, filed Nov. 29, 1991, incorporated herein by reference. In order to obtain the message, data and control circuit 402 of the subscriber terminal tunes up/down converter 401 to the channel defined by the tuning field and searches for a message transaction transmission with the same display number as in the message definition transaction transmission. In a preferred embodiment, the tuning data instructs the subscriber terminal to tune either the channel currently tuned, one of the message channels, the scroll channel, or the OFF channel to retrieve the appropriate message. The message definition transaction transmission of FIG. 6B is preferably sent on all datastreams output by headend controller 130 in order to most quickly inform a subscriber that he or she has a message.

Although multiple messages may be sent to a subscriber terminal, each subscriber terminal only maintains one pending message definition transaction. This is the message obtained by using the menu structure referenced above. As long as messages are not read, the pending message definition is updated as new message definition transactions are received. The priority of this update is in accordance with the display number in the message definition transaction, such that for two unread messages, the lower display number is read first. A message that has not been read always has priority over a message which has been read.

When a subscriber terminal receives a message definition transaction defining a message for that subscriber terminal, a message alert may be provided. For example, microprocessor 410 may control a segment of LED display 413 to blink on and off. The LED alert ends when the last screen of the message is received if there are no more active unread messages for the subscriber terminal.

In addition to this method of alert, the message definition may include on screen alert data which instructs microprocessor 410 to generate an on-screen message alert on associated television receiver 408. If such data is included in the message definition transaction, an on-screen message alert may overlay the video until a key on keyboard 411 of the subscriber terminal or remote control 412 is pressed.

Other methods of alert include activating a buzzer connected to the subscriber terminal, connecting a relay switch, turning on a light, or other devices which could be electrically connected to the subscriber terminal and engaged in response to an alert data field transmitted with one or more messages addressed to a subscriber terminal. In addition, a duration parameter may be transmitted such that the particular alert mechanism is engaged for a prescribed period of time. Thus, for example, a buzzer could be sounded for a programmed period of time such as five minutes, as determined by a field set by the system control computer and transmitted through scramblers 104a–104f or ATX 140.

Preferably, the character codes and layout of the on-screen (or other) message alert are storm in ROM of microprocessor 410. The message definition transaction instructs microprocessor 410 to supply the appropriate character codes and layout information to on-screen display control 406. No alert may be given and no messages received if the subscriber terminal is not tuned to a channel with data.

When the message is displayed, it remains on the screen until the user changes the screen. If there are multiple screens, the subscriber may cycle through all message screens and back to the beginning as many times as desired. At each new screen, there will be a waiting time until the appropriate screen is retrieved. When the last screen of a message has been received, the message is defined as being read. After all active messages have been read, the messages can be reread.

Messages are transmitted for a period of time configured by the headend so that message channel data is minimized. An active message control transaction from the headend which flags all groups with active messages is sent periodically. This transaction controls message expiration.

PREFERRED USER SCREEN LAYOUTS AND OPERATION

The present invention contemplates using a menu-driven windowed environment (such as the X WINDOW system, provided by the Massachusetts Institute of Technology) on system control computer 120 to allow a user to define and schedule messages to subscriber terminals, and to define groups in accordance with selection criteria or list criteria described in greater detail herein. The following description makes reference to FIGS. 13 through 19, which present a preferred embodiment of screen layouts which result in "user friendly" interaction with a user. It will be recognized that many variations of these screen layouts are possible, and the particular features (sizes, color selection, shapes, options, order of presentation, and other parameters) may be varied to suit a particular user type without departing from the principles of the present invention. The preferred embodiment allows a user to control the operation of the present invention with a minimum number of menu levels for simplified operation. Many of the options on the depicted screens will be apparent in their operation, such as EXIT, PRINT, HELP, etc., and therefore no further explanation is provided.

Figure 7:
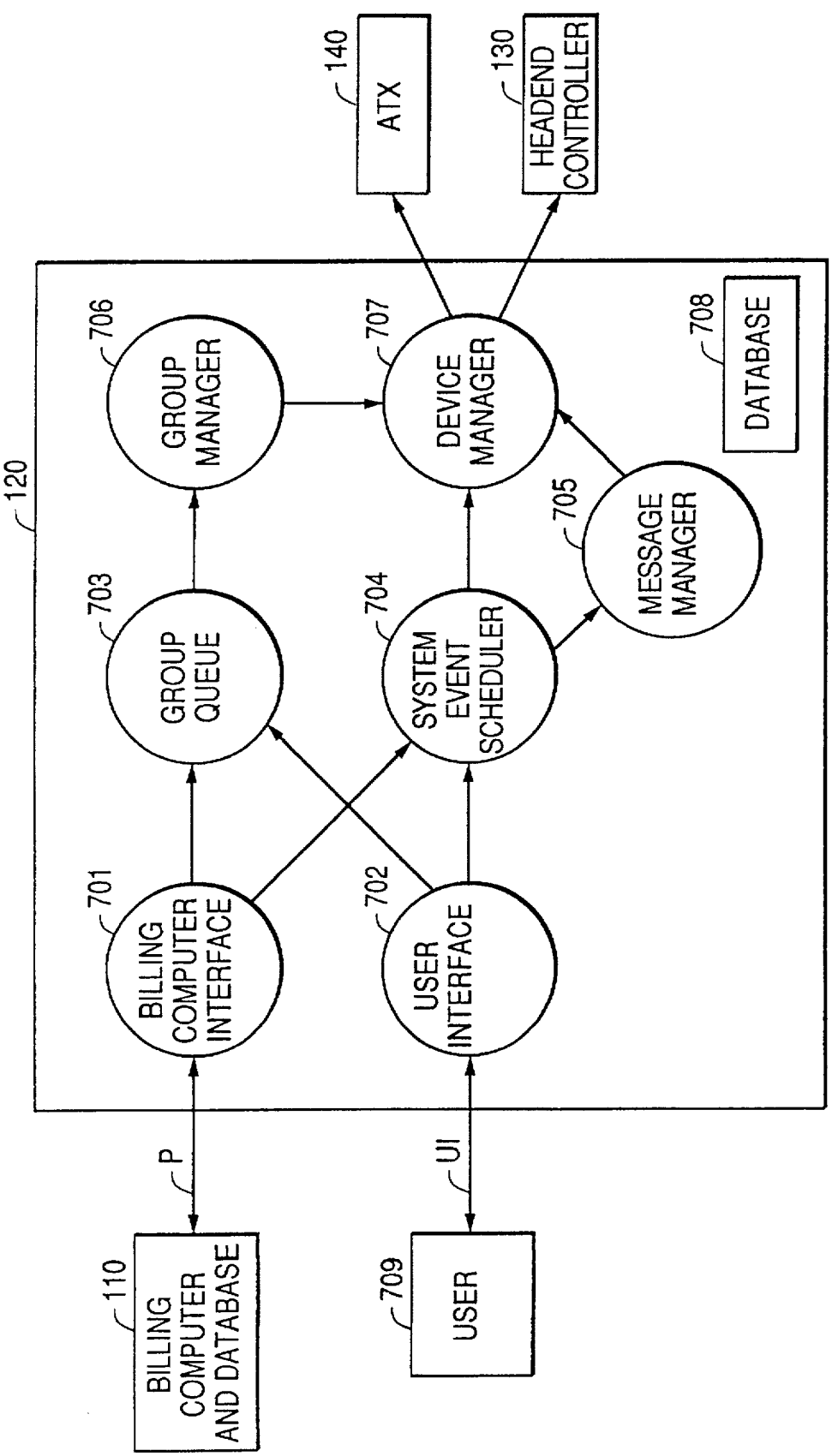
FIG. 7 is a block schematic diagram showing computer programs and their relationships within system control computer 120 and with billing computer 110 in accordance with the principles of the present invention.
Figure 13:
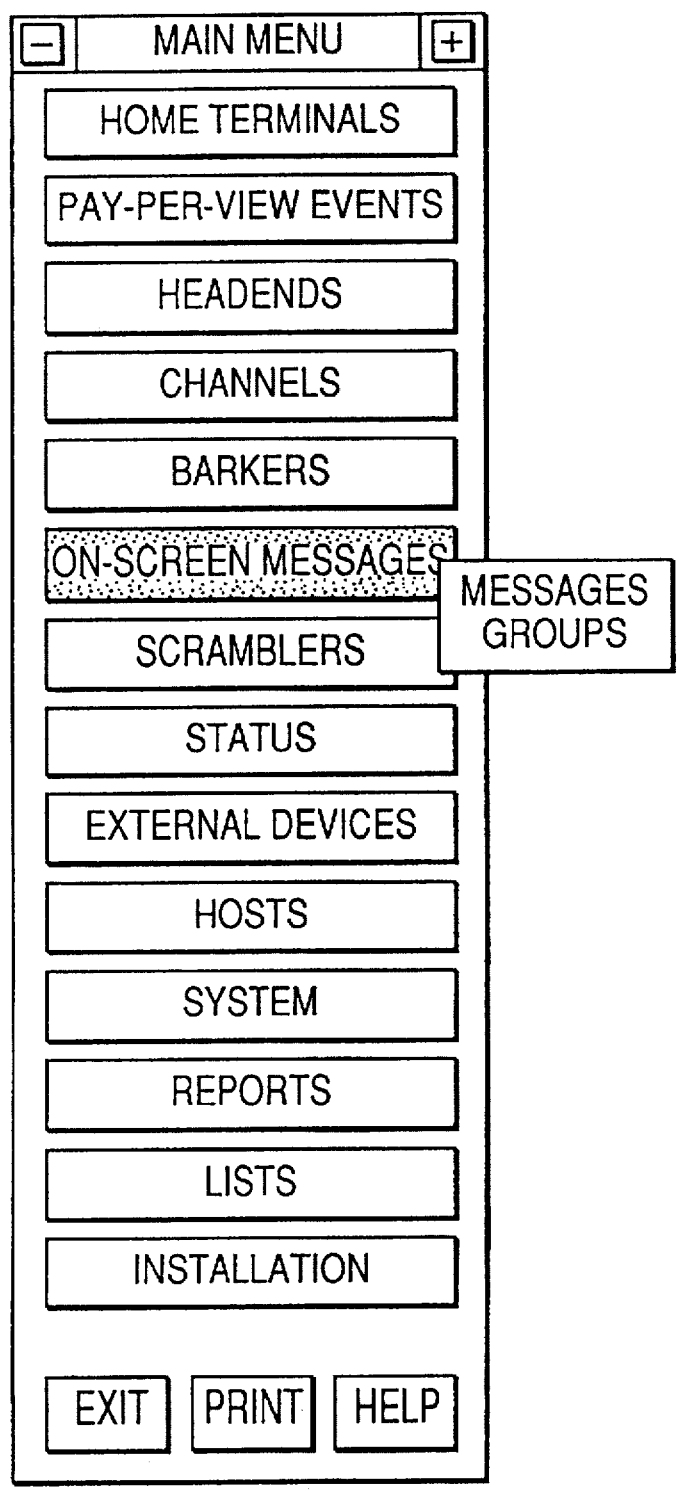

FIG. 13 shows an introductory menu bar which may be presented by a user interface computer program described more fully herein with reference to FIG. 7. The two primary selections of interest from this menu are MESSAGES and GROUPS. Other selections such as HOME TERMINALS and BARKERS are not described herein as they are not relevant to the present invention.

By way of a user selecting the MESSAGES option from the menu bar of FIG. 13, the screen depicted in FIG. 14 may be displayed. This screen allows the user to create a message for transmission to a particular subscriber terminal or a group of terminals. The user may enter a message number to uniquely identify the message for a particular headend. The combination of headend number and message number serves to uniquely identify the message in a subscriber television system. The user may then enter a brief description of the message into a description field as shown in FIG. 14. By selecting the EDIT TEXT button, the user may create a message of multiple pages for transmission to the user through a separate "pop-up" window (not shown).

Additionally, various message control fields such as the size of the first line of the message, blank screen before display, message alert, and background color may be selected by the user. These message control fields indicate how the message will be displayed to the selected subscriber or group of subscribers, and described more fully herein. Only a subset of the possible message control fields are shown in FIG. 14.

By selecting the ASSIGN MESSAGE button from the screen of FIG. 14, the screen of FIG. 15 may be displayed. Using this screen, the user may assign the created message to a particular subscriber terminal by entering a headend code and the serial number of the subscriber terminal in the HEADEND CODE and AVAILABLE SERIAL NUMBER fields. By pressing the ADD or REMOVE buttons, multiple subscriber terminals may be added to the list of terminals to which the message will be transmitted.

Figure 16:
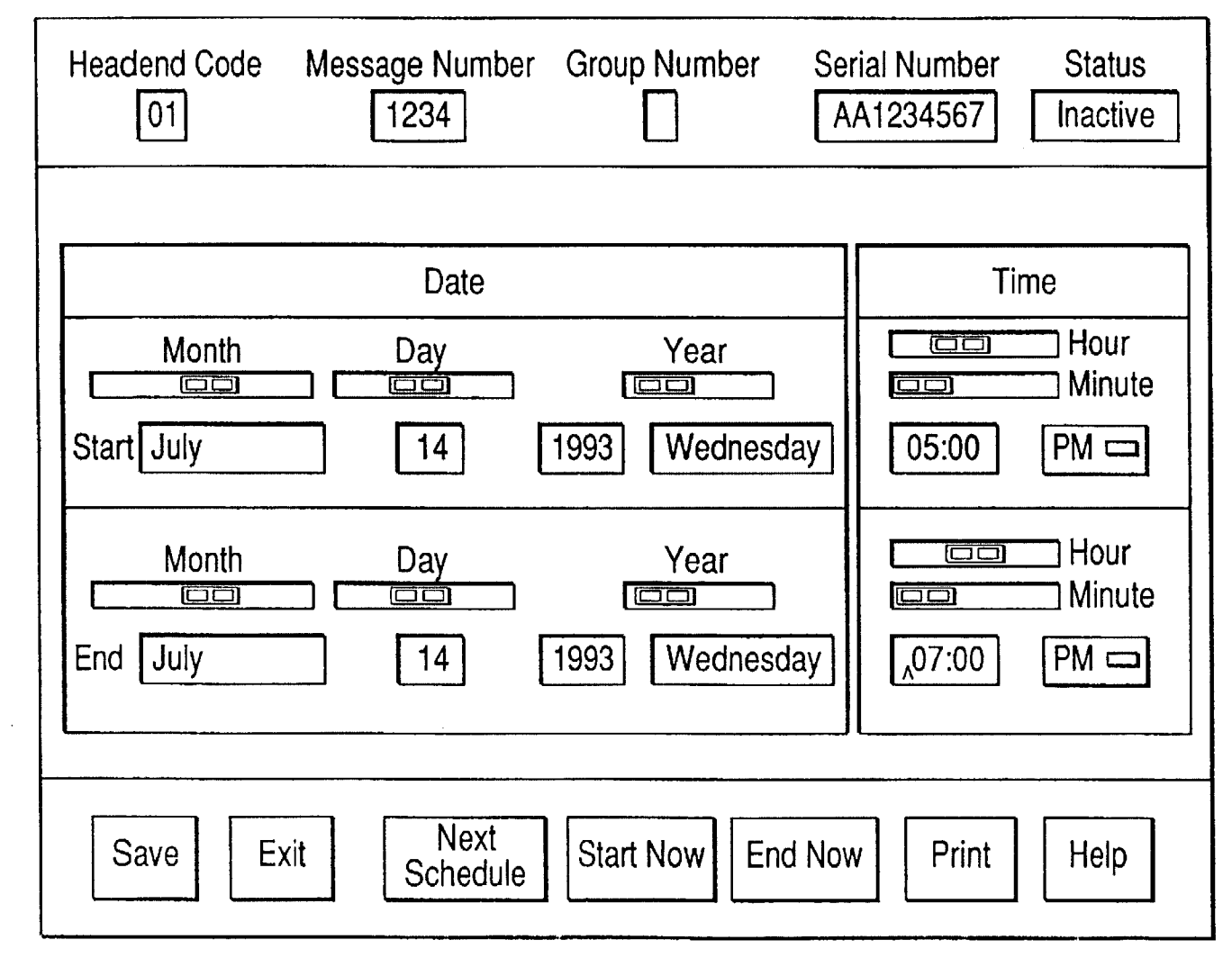

Referring again to FIG. 14, by selecting the SCHEDULE MESSAGE button from the bottom of the screen, the screen of FIG. 16 may be displayed. This screen allows the user to enter a starting time and date, and ending time and date, for the specified message. This will cause the schedule information to be entered into a database within system control computer 120 for subsequent scheduling. In accordance with the present invention, computer programs and apparatus described herein will cause the selected message to be transmitted to the designated subscriber or list of subscribers at the designated time until the ending time is reached.

Figure 17:
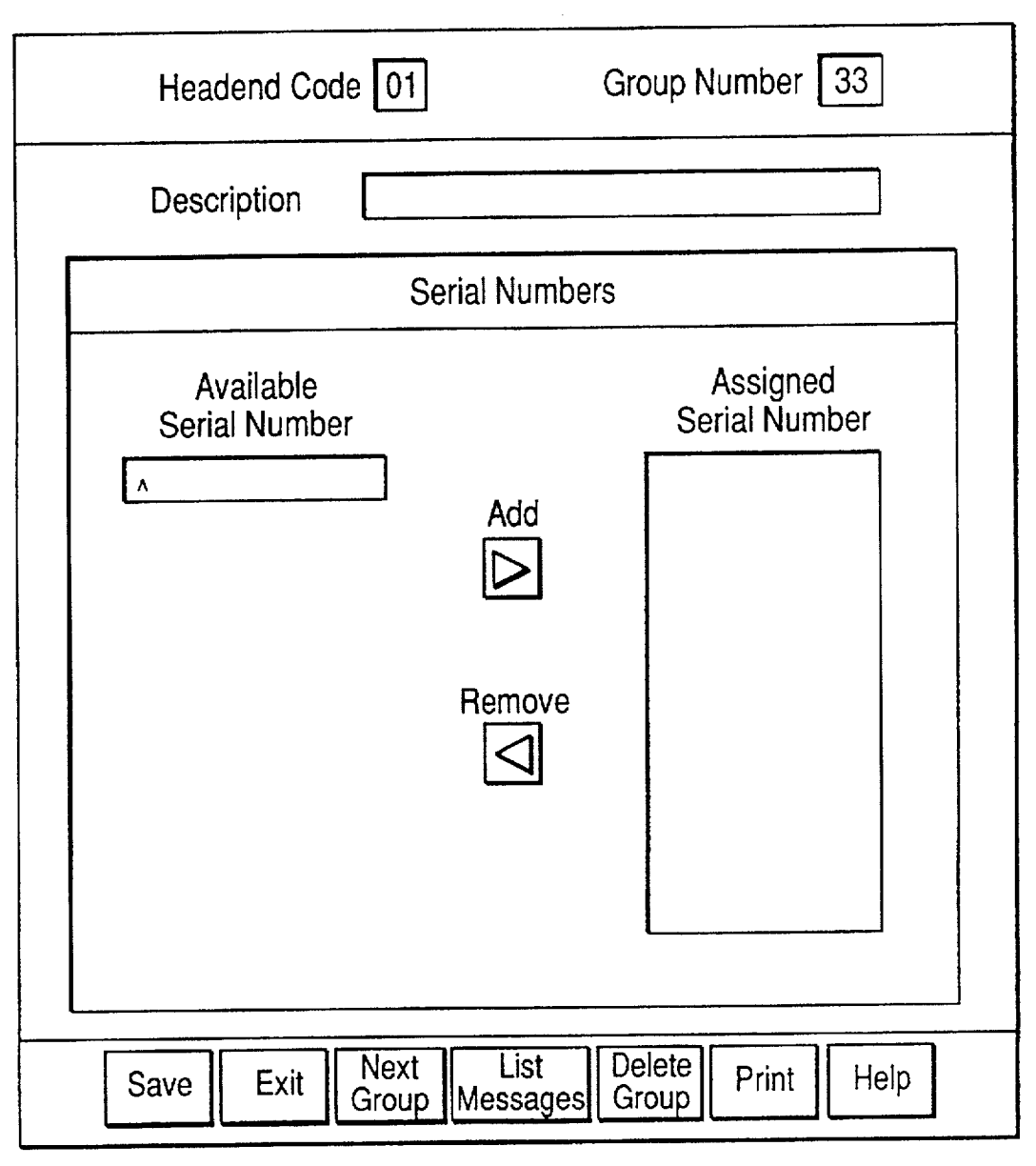

Referring again to FIG. 13, selecting the GROUPS option from the menu bar may cause the screen of FIG. 17 to be displayed. Using this screen, the user may assign one or more subscriber terminals to a group. This may be done by entering a group number to identify the group, the headend code, and one or more serial numbers of subscriber terminals which make up the group. This type of group is referred to hereinafter as a "list group" because it consists of a list of subscriber terminals. Messages sent to a group of subscribers may be scheduled in the same manner as those to a single subscriber through the use of the screen in FIG. 16.

More sophisticated groups may be defined through the use of "selection criteria" by way of FIG. 18. Using subscriber characteristics such as the subscriber terminal status (enabled, disabled, or other status), serial number, digital address, subscriber terminal feature (such as remote control, IPPV option or others), or service code (indicating whether the subscriber has HBO, Cinemax, Disney, Basic service or some other combination) in combination with relationships and operators depicted in FIG. 18, the user may create criteria which define a particular group of subscribers. For example, the user may create a group of subscriber terminals comprising those subscribers having HBO, remote control and whose terminal is enabled. These subscribers may then be conveniently and automatically grouped so that a message may be sent to them for, e.g., advertising purposes, informational, or some other purpose. Further details of this selection criteria language can be found herein under the heading of Selection Criteria Statements.

Figure 19:
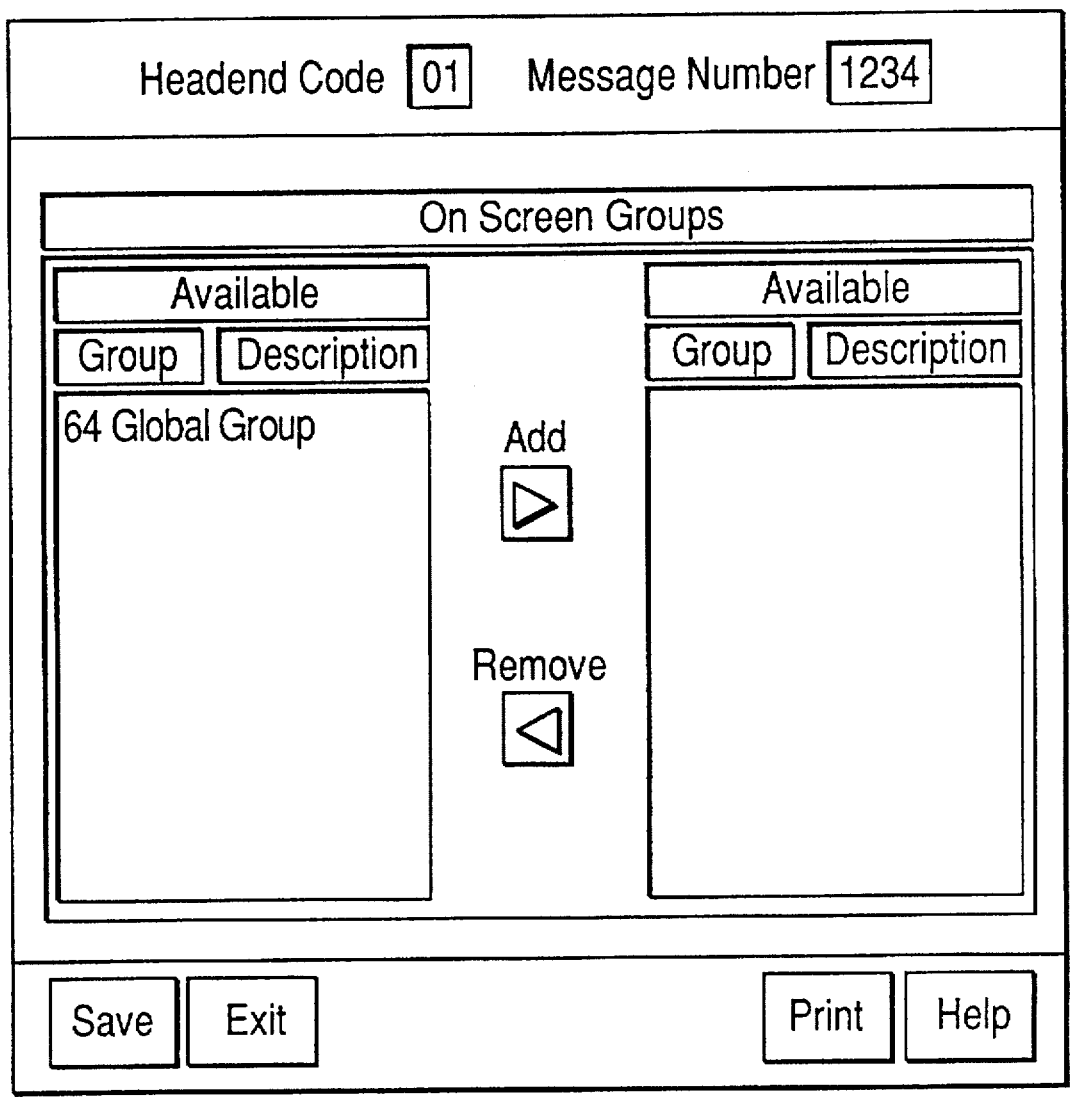

Referring to FIG. 19, the user may assign a message to one or more groups of subscribers by entering the headend code, message number and one or more groups in the AVAILABLE column of FIG. 19. Pressing the ADD button will add a group to the message, while pressing the REMOVE button will remove a group from the message.

SYSTEM CONTROL COMPUTER PROGRAM DESIGN AND DATABASE

The preferred process of creating groups, composing messages, addressing messages, and transmitting messages in accordance with the principles of the present invention includes the use of computer programs executing on system control computer 120. A description of the design, detailed characteristics and preferred data structures of these computer programs follows.

With reference to FIG. 7, system control computer 120 contains a number of computer programs including billing computer interface 701, user interface 702, group queue 703, system event scheduler 704, message manager 705, group manager 706, and device manager 707 which cooperate to provide message services and group services in the system. A database 708 configured to execute on system control computer 120 (for example, the INFORMIX® relational database), may be conveniently used to store data structures needed by the various computer programs. A description of the function of each computer program of FIG. 7 will now be provided.

Billing computer interface 701 interacts with billing computer 110 over a link according to a protocol P described herein. This program stores incoming commands from billing computer 110 into database 708 and notifies either group queue 703 or system event scheduler 704 that a request has been received, depending on whether a group command or a message command was received. It also sends a return code back to billing computer 110 to acknowledge receipt of the command. Selection criteria statements received from billing computer 110 are stored in database 708 in the converter group table of FIG. 9(D) for subsequent retrieval by group manger 706.

User interface 702 accepts inputs from and displays results and status to a human user 709 situated at system control computer 120 from a local terminal. This user interface may be implemented using the X WINDOW system. A preferred set of user interface screens is depicted in FIGS. 13 through 19, which were previously discussed in more detail in connection with the principles of operation of the present invention. In particular, user interface 702 may organize user grouping selections shown in FIG. 18 into a selection criteria statement for storage into database 708 in the converter group table of FIG. 9(D) for subsequent retrieval by group manager 706.

Group queue 703 handles all group commands initiated by either user interface 702 or billing computer interface 701. These commands may be sent via UNIX® IPC queues. Further details of the UNIX® operating system may be found in Bach, *The Design of the UNIX Operating System*, copyright 1986, published by Prentice-Hall, Inc. The main function of group queue 703 is to ensure that the input queue to group manager 706 is not overloaded, and to ensure that no commands sent to group manager 706 are lost due to power loss or re-boot. This is achieved through the use of internal and disk based queues. In the event group manager 706's queue is full, group queue 703 will place the command in an internal queue. If its internal queue is filled it will place the commands in a disk based queue in a file on disk (not shown). In the event of a power loss or re-boot, group queue 703 will take any command in its internal queue as well as those in group manager 706's input queue and place them in the same disk file. On boot-up, group queue 703 checks the disk for the presence of this file and places any commands found there back on the input queue for group manager 706.

Group manager 706 processes all commands from group queue 703. These commands are sent via a UNIX® IPC queue. Group manager 706 interacts with database 708 to retrieve group information from various database tables and translate this into fields which distinctly identify particular subscriber terminals. In a preferred embodiment, group manager 706 converts selection criteria statements into Structured Query Language (SQL) statements suitable for querying a relational database. This conversion involves a straightforward translation of the operands, operators and values of a selection criteria statement into the appropriate SQL constructs. SQL is generally well known in the computer programming and database engineering arts, and correlation between the constructs of SQL and those disclosed herein as part of the selection criteria statement language for implementation in a cable television system of the present invention will be apparent to one of ordinary skill in the art. Following is a description of the commands and detailed operations performed by group manager 706.

Building A Group

The process of building a group determines which subscriber terminals belong to a newly defined selection criteria group. This is achieved by applying selection criteria (described herein) against all subscriber terminals associated with the particular headend. Since list groups do not have selection criteria, this command applies only to selection criteria type groups. A subscriber terminal's attributes are compared against the selection criteria, and if a match is found, a record is placed in the database in the CVT_CVT group table of FIG. 9(C). In addition, a command is sent to the subscriber terminal via device manager 707 to inform the subscriber terminal that is it now a member of that group.

Each particular terminal is uniquely identified through its digital address; there exists a one-to-one correspondence between a terminal's digital address and serial number, as indicated with reference to the converter table of FIG. 10(A). This command is usually executed immediately after a new selection criteria group has been defined.

Rebuilding An Existing Group

The process of rebuilding a group determines which subscriber terminals belong in a selection criteria group which has previously been defined. This is achieved by determining which subscriber terminals need to be deleted from the group and which need to be added to the group. A subscriber terminal's attributes are compared against the old and new selection criteria, and if the subscriber terminal was in the old group but not in the new, it is deleted from the data base (in the CVT_CVT group table) and a notification is sent to the affected subscriber terminal via device manager 707 to indicate that it is no longer in the group. If the subscriber terminal was not in the old group but is in the new, the subscriber terminal is added to the data base (CVT_CVT group table) and a notification is sent to the affected subscriber terminal that it is now a member of that group. If the subscriber terminal is found in the old and in the new groups, nothing is done because it is already in the group. This command is usually executed after a change has been made to the selection criteria of a group.

Deleting An Existing Group

Deletion of a group removes all references to the group from the system. When group manager 706 receives a request to delete a group, the message schedule table (FIG. 8(c)) is searched for all records which match the group which is to be deleted. For all records in this table having a status of "active", a request is sent to message manager 705 requesting that the message be terminated immediately, and the text be removed from the scrambler. All remaining records in the message schedule table corresponding to the specified group are deleted. The message converter group table (FIG. 9(B)) is searched and all records which match the specified group are deleted. Also, the CVT_CVT group table (FIG. 9(C)) is searched for all records which match the specified group. Each converter found is sent a command via device manager 707 to notify it that it is no longer a member of the group, and the corresponding records in the CVT_CVT group table are deleted. Finally, the group definition record in the converter group table (FIG. 9(D)) is deleted. This command is usually executed after a group deletion has been requested from user interface 702 or through billing computer interface 701.

Refreshing a Subscriber Terminal's Group Map

As groups are built and rebuilt, records are placed in the database which define which subscriber terminals are in particular groups. A subscriber is either in a group or not. A subscriber terminal's group map is defined as a collection of 64 bits (one bit per group) which represents the groups to which a subscriber terminal belongs. If the Nth bit is set, the subscriber terminal belongs to the Nth group.

The process of refreshing a subscriber terminal's group map is achieved by reading the data base (particularly the CVT_CVT group table of FIG. 9(C)) and constructing the group map as a bit mapped field with bits set for every group of which the particular converter is a member. The bit map is then sent to the subscriber terminal via device manager 707. It is important to note that existing data is used. That is, the group is not rebuilt every time a subscriber terminal is refreshed. In fact, the selection criteria is never accessed while processing this command. This command is usually executed after a subscriber terminal refresh has been requested from user interface 702 or through billing computer interface 701.

Rebuilding a Subscriber Terminal's Group Map

Whenever a subscriber terminal's attributes change (for example, a service code change to add HBO), the groups to which the particular subscriber terminal belongs must be re-evaluated against the selection criteria which defines each group defined on the headend. This process is known as rebuilding a subscriber terminal's group map. This command is usually executed after a subscriber terminal's attributes have been changed by either user interface 702 or through billing computer interface 701.

Rebuilding All Groups on a Headend

The processing of this command is the same as the processing for the rebuild group command except that with this command all groups on the headend are rebuilt instead of just one.

The operation and design of system event scheduler 704 will now be described. System event scheduler 704 acts as a "clock" for the other computer programs executing on system control computer 120. That is, it keeps track of when certain events need to occur, such as activating a message at a preset time. It may query database 708 to retrieve start and stop times for particular messages and store these as programmed events internally. When the programmed time occurs, system event scheduler 704 may issue a request for action to one or more of the other computer programs on system control computer 120. For example, when system event scheduler 704 determines that it is time to send a message to a particular subscriber terminal, it may place a request on an input queue of message manager 705, causing message manager 705 to query the database for any needed information such as digital address, headend code, message number, message control data, etc. Message manager 705 would then issue a request to device manager 707 to send the message to the addressed subscriber terminal.

The operation and design of message manager 705 will now be described. The functions of message manager 705 include activating a message, deactivating a message, modifying an active message (text only), deleting an active message, scrambler message memory management (determining how a message can fit into scrambler memories), and rebuilding scrambler memories. Message manager 705 serves as the coordinator for user interface 702 and billing computer interface 701 via system event scheduler 704. That is, all inputs to message manager 705 are from either billing computer interface 701 or user interface 702 via system event scheduler 704.

Message manager 705 is a command driven, transaction processing program. Communication with message manager 705 may be via interface routines which place commands for processing on a message manager 705 input queue. Following is a description of functions performed by message manager 705 in response to the indicated command.

A START_MESSAGE command directs message manager 705 to activate the given message, and will be executed whenever system event scheduler 704 detects the condition that the start time for a message has arrived. The process of activating a message involves storing the message text in a down stream device and informing a specific subscriber terminal or group of terminals to "look" for the message. Messages sent via in-band channels are stored in scramblers 104a–104f (FIG. 1) which have a message data stream. Messages sent through out-of-band channels are stored in ATX 140 (FIG. 1). Scramblers can have varying amounts of memory (such as 32 kilobytes or 128 kilobytes) in which to store messages, if costs are of concern to the system user.

Scramblers are attached to a single headend, each headend having a plurality of scramblers.

Before a message may be scheduled (either immediately or in the future), space must be "reserved" in a scrambler. To keep track of how much memory remains in each scrambler, a scrambler table (FIG. 10(B)) may be used to conveniently store this information for retrieval. To reserve space in a scrambler, all message scramblers on the headend to which the subscriber terminals are connected (either an individual terminal or a group) are checked to find the one having the most available memory. The message will be placed in the scrambler which, at the start time, will have the most available memory. The scrambler table in the database will then be updated to reflect the new available memory size for the selected scrambler. If there is no room in the scramblers for the given message, the message cannot be scheduled.

An END_MESSAGE command directs message manager 705 to deactivate the given message, and will be executed whenever system event scheduler 704 detects the end time for a message has arrived. This operation is performed by notifying device manager 707 to remove the message from the particular scrambler's memory.

A DELETE_MESSAGE command directs message manager 705 to delete an active message. It differs from the END_MESSAGE command in that status of the message in the data base is changed to indicate that the message has been deleted.

A MODIFY_MESSAGE command directs message manager 705 to modify an active message in the scrambler's memory. This allows the text of a message to be changed or its control information changed.

A REBUILD_SCRAMBLERS command directs message manager 705 to rebuild all the messages in the given scrambler's memory. It performs this operation by querying the message schedule table to find all active messages which are assigned to the particular scrambler, then forwarding these to device manager 707 to program the scrambler.

In the event of a power loss or re-boot, message manager 705 will take any command in its input queue and place them in a disk file. This is done to preserve any pending message actions. On boot-up, message manager 705 checks the disk for presence of the file and places any commands found there back on its own input queue.

The operation and design of device manager 707 will now be described. When instructed to command a particular device, device manager 707 retrieves appropriate subscriber terminal addressing information from database 708 to allow the device to be programmed. It then builds device-specific transactions for either ATX 140 or headend controller 130 and issues the commands over a hardware port available on system control computer 120.

Scramblers store message text in subscriber terminal transactions (STT). These are specific commands that each particular type of subscriber terminal can understand. For a given message, these transactions are repeated as long as the message is active (i.e., as long as the message is in the scrambler's memory). Headend controller 130 translates the ATX transactions for a message (i.e., one per message page) into the appropriate number of STT transactions. System control computer 120 must know the format of the STT transactions and how the headend controller translates the ATX transactions in order to determine if a given message will "fit" into a given scrambler.

At the time the message text is defined, system control computer 120 must determine the message size (in STT transactions) in the same manner as the headend controller. The message size is then stored in the data base in the message table of FIG. 8(A) so that when the system attempts to schedule a message, this information is readily available (i.e., it will not need to be calculated every time).

Library Functions

Message data processing can be divided into four areas: message control, message text, message assignments and message schedule information. In user interface 702, this processing is divided between several screens. In billing computer interface 701, this processing is divided between several commands. Either user interface 702 or billing computer interface 701 can perform three basic actions on each group of data: add, change, and delete. Library routines are therefore suggested to perform the following functions:

Add Message Control Information

Change Message Control Information

Delete Message Text

Add Message Text

Change Message Text

Add a new Message Assignment

Delete an existing Message Assignment

Add an entry into the Message Schedule

Change an entry into the Message Schedule

Delete an entry from the Message Schedule

Additional library routines may be used for maintenance purposes. These routines provide the capabilities to:

Delete all of a specific converter's messages.

Delete all of a specific scrambler's messages.

Delete all of a specific headend's messages.

Delete all of a specific headend's group definitions.

Rebuild all messages stored in a specific scrambler.

Rebuild all messages stored in all scramblers on a headend.

There are other library routines which are considered utility routines. These routines perform the following basic operations:

Convert Message Text from ASCII format to converter character set format.

Convert Message Text from converter character set format to ASCII format.

Insert Message Instructions on a page of Message Text.

Delete a Subscriber Terminal from an Addressed Group.

Determine how much of a scrambler's memory is used.

Compress a Message's Text.

Uncompress a Message's Text.

Determine the size of a Message's Text.

It will be readily apparent to one of ordinary skill in the art that such routines can be easily created to suit a particular implementation. For example, if a rational database is used as suggested, various database vendors provide utility routines to add, delete, and modify database records in the database. Such utility routines can be used to directly implement most of these basic operations. Moreover, various data compression schemes are well known in the art and can be used to compress data if necessary.

DATA STRUCTURES

Preferred data structures used in the present invention will now be described in detail. A message consists of message control data and message text. Message control data instructs a destination subscriber terminal how to retrieve and display the message, whereas message text is the actual combination of characters which is to be displayed on the television screen. With reference to FIG. 8, message control data is stored in a message table in database 708. Message text for each message is stored a page at a time in the message text table, entries of which may be associated with a message table as shown in FIGS. 8(A) and 8(B).

Message control data may be entered by the user at the system control computer for subsequent use by the destination subscriber terminal. The user may enter such data using a data entry screen such as that illustrated in FIG. 14. This control data may include, but is not limited to the following:

Size of text line 1
Pre-blank
Background color
Clear message received flag
Alert LED
Buzzer
Contacts
Buzzer/Contact period
Priority
Display valid period
Tone
Immediacy
Message Alert
Cvt/AC relay power on Size of text line 1 indicates to the subscriber terminal the size of the first line of the message. The first line of any message may be twice the normal size but half the number of characters.

Pre-Blank indicates to the subscriber terminal that it should collect all the characters in a message in its internal buffers before it displays the message on the subscribers television. In the pre-blank mode, the subscriber terminal will blank the screen before displaying the message. This gives the appearance of a message "popping up" on the screen. Without pre-blank mode, the subscriber terminal displays the characters on the screen a character at a time. This gives a more teletype appearance.

Background Color indicates to the subscriber terminal which color should be displayed in the background of the message.

Clear Message Received Flag indicates to the subscriber terminal to re-display a message which the subscriber has already read. This is commonly used when the text of a message has changed.

Alert LED indicates to the subscriber terminal to flash the message alert LED when a message has been received. This parameter is usually set to be ON in the system control computer.

Display Valid Period indicates to the subscriber terminal how long, in terms of time, a message may be displayed. After the display valid period has expired the subscriber terminal will no longer flash the Alert LED if the message has not been read by the subscriber.

Message Alert indicates to the subscriber terminal if the message alert message should be flashed on the subscriber's television screen or through other means (e.g., buzzer, engaging a relay, etc).

Associated with each message is a set of schedule information. This information informs system control computer 120 what to do with the message and when to do it. The following schedule information may, for example, be maintained for each message:

Display number
Message status
Starting date and time
Ending date and time
Size of the message (in STT transactions)
Identifier of scrambler where message will be stored This information is stored in a message schedule table (see FIG. 8(C)) in system control computer 120. The information in this table serves as both the message schedule (future events) and the active events currently stored in the scramblers.

As indicated above, each message can contain a message Status. The following are various states that a message can take on:

| | |
|---|---|
| Inactive: | Not currently scheduled |
| Scheduled: | Has a starting and ending time |
| Pending: | Message is currently in the process of changing from Inactive or Scheduled to Active status. |
| Active: | Message is currently being sent to terminals (converters). It is currently stored in a scrambler. |
| Cleanup: | Message is currently in the process of changing from Active to Inactive status. |

Messages can be associated with a group of subscriber terminals (group message), a single subscriber terminal (addressed message) or not associated with either (stand alone message). A stand alone message is defined in terms of the scheduling information as a message with no display number, no status, no starting or ending date/time, and no calculated message size. It has an entry only in the message table (see FIG. 8(A)).

Messages may be associated with a single group or multiple groups at the time the message is defined. Associating a message with a group will cause an entry to be placed in the message converter group table (FIG. 9(B)) as well as the message schedule table (FIG. 8(C)). Associating a message with a group means that at the time the message becomes active, only the subscriber terminals in the group will receive the message. Messages may be associated with a single subscriber terminal or multiple terminals at the time the message is defined.

Associating a message with a subscriber terminal will cause an entry to be placed in the CVT message table and the message schedule table (see FIGS. 9(A) and 9(C)). Associating a message with a subscriber terminal means that at the time the message becomes active, only that subscriber terminal will receive the message.

Messages may have scheduling information associated with them at the time they are created, if associated with a group or subscriber terminal. If the starting date/time is in the future, it will be added to the message schedule table (FIG. 8(C)) with a status of scheduled. If the starting date and time is current, is will also be added with a status of scheduled. With reference to FIG. 7, by the time system event scheduler 704 receives the message, it will detect the expired time stamp and immediately send an activation request to message manager 705.

Reference will now be made to FIG. 11. A message designed for in-band data transmission can contain up to 16 pages of text. All message text is stored in the converter character set defined for the headend. FIG. 11 provides a preferred list of character codes for a particular type of subscriber terminal. A page of message text may contain a certain number of characters, determined by the readability of the image, the resolution of the display and so on. For example, the message size might vary from 64 to 512 characters and preferably comprise a maximum amount of about 240 characters (10 lines×24 columns).

Reference will now be made to FIG. 12. Each converter character set may contain a series of "character compression" codes. These codes allow certain predefined words (days of the week, on-screen menu instructions, etc.) and actions (display currently tuned channel, date, time, etc.) to be defined in two characters. These message compression codes lessen the number of characters which need to be transmitted to the subscriber terminal, thus reducing transmission time and downstream device storage. A list of preferred compression codes is shown in FIG. 12.

As can be seen from FIG. 12, compression codes may be provided for commonly displayed words, resulting in more efficient transmissions. Different categories of codes may be created to display, for example, commonly used verbs (such as "press", "clear", "set", or other instructions to the viewer), days or dates (such as "Sunday", "Monday", "now"), or even word fragments (such as "er", "ed", "re"). Under the control of system control computer 120, messages which are created by user 709 may be automatically shortened using these compression codes without user 709 being aware of the process.

The compression codes are preferably managed by message manager 705 and may be dynamically varied depending on their utilization over time. For example, if the compression code 91 for "SET TOP" is underutilized in messages over time, the code 91 may be utilized for another message element or word which is more frequently used. "SET TOP" may then be sent by means of the character codes of FIG. 11 when required. Message manager 705 may measure the frequency of use for compression codes and change them to optimize transmission performance. Compression code changes may be transmitted to subscriber terminals through the use of a global transaction to all subscriber terminals.

SELECTION CRITERIA GROUPS AND LIST GROUPS

A group is a way for the user (either at system control computer 120 or, alternatively, from billing computer 110 through billing computer interface 701) to define a collection of subscriber terminals. Groups are not tied to any particular functionality within the system. Groups can be used for refreshes, reports, IPPV callbacks, or even partial downloads from billing computer 110. Therefore, the term "group" as used herein does not refer to a predetermined class of subscriber terminals such as, for instance, the class of subscriber terminals which support a particular feature like remote control.

Groups are defined on a headend basis and are identified by a group code. The combination of headend code and group code makes the group unique in the entire subscription cable television system. Each headend could have, for example, a certain maximum number of groups determined primarily by memory limitations and the expected application by the viewer. A reasonable maximum number of groups, for example, may be 64. Of these, at least one may be reserved as the global group, which includes all terminals connected to the headend.

When a new headend is defined, a group definition is created which places a group definition record for that headend into database 708 of system control computer 120. Every subscriber terminal on the headend will be a member of the global group for that headend. Conveniently, the highest number group (such as 64) may be reserved to identify this global group.

In order for any subscriber terminal to receive an addressed message, it must be a member of an addressed message group. If a terminal is a member of two addressed message groups, it may receive two addressed messages simultaneously. There is a one-to-one-correspondence between the number of addressed message groups that a subscriber terminal belongs to and the number of addressed messages that the terminal can receive simultaneously. In order to receive an addressed message, a subscriber terminal is first notified that it is a member of a group (i.e., a one-terminal group), and subsequently the message for that group is broadcast over the cable system. The subscriber terminal so notified will be "looking" for a message corresponding to the specified group and will be able to extract it from the broadcast.

There are two types of groups: selection criteria groups and list groups. Selection criteria groups are those groups for which the selection criteria is known by system control computer 120 through fields kept in its database 708. Membership in the group is determined by comparing individual subscriber terminal records in database 708 against the selection criteria, which may be conveniently done using a relational database query.

The following is a list of typical selection criteria which may be used to select terminals from database 708:

Digital address range

Serial number range

Converter feature combinations (remote control, IPPV, etc.)

Converter status (enabled, disabled, etc.)

Service code combinations (Showtime, HBO, etc.)

Thus, selection criteria groups can be defined either from user interface 702 at system control computer 120 or remotely through billing computer interface 701. If there are additional selection criteria in the system control computer 120 database, they may be used as well to define groups from system control computer 120.

List groups, on the other hand, are those groups for which the selection criteria are unknown by system control computer 120. Membership in the group is determined by externally defined criteria, such as selections made from a different subscriber database maintained in billing computer 110. The only information contained in system control computer 120 about each of these groups is that a particular list of subscriber terminals belongs to each group. Once a terminal is a member of a list group, it will remain a member of the group until system control computer 120 is notified that it is no longer a member of that group. Such notification could occur either manually (i.e., a user 709 at system control computer 120 deletes the group) or remotely (through, e.g., billing computer interface 701).

Billing computer 110 may create specific groups based on its own subscriber database (for example, creating a list of all subscribers whose birthday coincides with the current date) and, by correlation with specific converter serial numbers stored in its database, transmit this group to system control computer 120 for subsequent processing. System control computer 120 may then query its database to extract additionally required information such as headend code, digital address, and scrambler address through the use of the previously described computer programs to schedule and activate the desired messages.

In addition to selection criteria, both list groups and selection criteria groups may also have other attributes, such as the following information items:

Group code

Headend code

Group description

Selection flag (selection criteria or list criteria)

Group status (never built, building, built, or deleting)

Last build time

Once a group has been defined, it must be "built". Building a group consists of determining which terminals belong to the group (i.e., they match the selection criteria). Initially, groups are added to the database (converter group table, see FIG. 9(D)) with a status of "never built". In the case of selection criteria groups, group manager 706 is instructed to build the group. It will change the status to "building" and, on completion, change the status to "built". In the case of a list group, a group definition record will be added to the CVT_CVT group table (FIG. 9(C)).

When a new subscriber terminal is added to the system control computer (either manually via user interface 702 or remotely through billing computer interface 701), group manager 706 determines which groups the subscriber terminal belongs to. This includes the global group, all addressed groups, and any selection criteria groups. It will add records to the appropriate tables in database 708 and instruct device manager 707 to send the appropriate ATX transaction to the subscriber terminal to inform it of the groups to which it now belongs.

When a subscriber terminal is changed, group manager 706 will determine if any changes in the terminal's group membership are needed. To do this, group manager 706 compares the terminal's attributes against any selection criteria group definitions and makes appropriate additions or deletions in tables in database 708. Membership in global groups, addressed groups, and list groups will remain unaffected by subscriber terminal changes. Group manager 706 will then instruct device manager 707 to send the appropriate ATX transaction or headend controller transaction to the subscriber terminal to inform the terminal of the groups for which it is now a member.

The global group is maintained by system control computer 120; it cannot be changed or deleted either from user interface 702 or remotely from billing computer interface 701. The global group is defined as the total range of digital addresses for the terminal type which is defined for that headend.

Addressed groups are maintained in system control computer 120. The number of addressed message groups allowed on a headend could be the data base, a parameter stored in the data base. An addressed group record in the data base may have a group type of one (addressed message group) and a selection flag of one (list group). The functions of messaging are divided between two programs and a series of library routines.

DEFINING GROUPS

Message groups can be defined from either user interface 702 or through billing computer interface 701. Groups are defined on a headend basis and are identified by a group number. The combination of headend code and group code makes the group unique in the system.

As previously explained, each headend may have a total of, for example, 64 groups. Of these, system control computer 120 may reserve one group number (such as group number 64), per headend, for a "global" group. Every subscriber terminal on the headend is a member of the global group.

There are two different types of groups. Selection criteria groups are defined by attributes known within the system control computer. Once a subscriber terminal is assigned to a selection criteria group, it will continue to be a member of that group until its attributes are no longer in the scope defined by the selection criteria. List groups are defined by attributes unknown by the system control computer. Once a subscriber terminal is assigned to a list group, it will continue to be a member of that group until the system control computer is told it no longer belongs to the group.

CREATING MESSAGES

On-screen messages can be sent only to those subscriber terminals which support the on-screen feature. Subscriber terminals which support this feature contain a character generator which when given the proper command will display a message to the subscriber.

The reasonable expectations of the user define a reasonable limit on the number of pages of a message, for example, a message may be up to 16 pages. Each page may be, for example, up to 240 characters (10 lines of 24 characters). Messages are stored in the data base a page at a time. Message pages are transmitted to subscriber terminals using codes which the character generator in the subscriber terminal understands (see FIGS. 11 and 12). These codes are collectively known as the converter character set. In addition to individual characters and numbers, the subscriber terminal character set contains codes which represent frequently used words or phrases. These codes are known as compression codes. The use of compression codes lessens the number of bytes transmitted to the subscriber terminal.

The user may also elect to add instructions to the user at the bottom of each page of text. The instruction lines tell the subscriber which buttons to push to get to the next page of a multi-page message and how to exit the message. A predetermined number of lines may be reserved for user instructions, for example, the two bottom most lines of a message page. If the function is enabled, the instructions may be, for example, automatically placed in lines 9 and 10 of the message text for display to the user.

ASSIGNING MESSAGES

Before a message can be broadcast from the system control computer, the system must first be told which subscriber terminal or group of subscriber terminals will be receiving the message. This process is known as message assignment. A message may be assigned to an individual subscriber terminal. Any time a message is assigned to a single subscriber terminal it is known as an addressed message; the subscriber terminal recognizes this as a separate group (i.e., the converter is notified that it is a member of a group, the group corresponding to the single subscriber terminal). A message may be assigned to a group of subscriber terminals. Any time a message is assigned to a message group it is known as a group message. Messages which are not associated with any subscriber terminals (individual or group) are known as stand-alone messages. All messages when they are entered into the system (via billing computer interface 701 or user interface 702) are stand-alone messages.

Assigning a message to an individual subscriber terminal means that when the message becomes active, only that subscriber terminal will receive the message. Assigning a message to an on-screen message group means that when the message becomes active, only the predetermined members of the group will receive the message. Messages may be assigned to multiple subscriber terminal and/or groups at the same time.

SCHEDULING MESSAGES

After a message is assigned, only then can it be scheduled to be broadcast to the intended subscriber(s). Messages may be sent immediately (start now) or in the future (scheduled). The process of activating a message involves storing the message text in a down stream device and informing a specific subscriber terminal or group of subscriber terminals to "look" for the message.

BILLING COMPUTER INTERFACE AND REMOTE CONTROL OF MESSAGING

Following is a description of a billing computer interface protocol, defined as a set of transactions, which allows billing computer 110 to remotely control on-screen message capabilities of terminal subscribers of a subscriber cable television system in accordance with the present invention. This protocol may be implemented over a phone line between a billing computer 110 and system control computer 120, for example a 9600 baud phone line or leased line, using modems to interface each computer to the phone line. Each transaction (or "command") originating from billing computer 110 is transmitted to system control computer 120, resulting in processing within system control computer 120 in accordance with computer programs described previously. Further details of the information presented herein can be found in Scientific-Atlanta Publication No. 33T122H, Scientific-Atlanta, Inc. Part No. 289910, dated October, 1992, incorporated herein by reference.

By using selection criteria statements, billing computer 110 may perform a download of selected subscriber terminal data from the billing computer database into system control computer 120. One advantage of this is a reduction in the amount of time required to update the system control computer database by allowing the update to be performed in segments (for example, one night downloading data for all subscriber terminals in a particular serial number range, and continuing the next night with a second set of subscriber terminals, and so on). Because of the limited bandwidth available over a phone link between billing computer 110 and system control computer 120, a complete download of data for hundreds of thousands of subscriber terminals can take two or three full days. By using selection criteria statements, separate portions of the database can be downloaded at a time, thus eliminating the need for a massive downloading operation.

Conversely, billing computer 110 may request an upload of subscriber terminal data from the system control computer 120 database. By using selection criteria statements, selected data sets can be extracted without the need to transfer the entire database. This results in substantial time savings.

Additionally, reports can be generated on system control computer 120 using selection criteria statements. System control computer 120 may be attached to a printer to which reports may be directed. Using selection criteria statements, particular subscriber terminal groups may be defined and reports created on the printer corresponding to fields in the system control computer database for the selected group.

It will be understood that billing computer 110 need not actually compute and send bills to subscribers, but could be any computer containing a database of subscriber information and communicating with system control computer 120 over a link. It may also be possible in a particular configuration for a subscriber demographic database and a system control database to reside on the same physical machine. The general format for each transaction is:

1. STX (ASCII start-of-text)
2. Data block (transactions described herein)
3. Checksum 4. CR (ASCII carriage return)

The first character following a CR is assumed to be the start of the next transaction. Each data block is composed differently for each transaction as described herein. The checksum is an exclusive "or" (XOR) sum of all bytes in the transaction, beginning with the first character after the STX character and up to, but not including, the checksum field. The checksum is sent in a hexadecimal ASCII format in two bytes. Billing computer interface 701 uses the checksum to verify that the transaction was received exactly as sent by billing computer 110.

A "return code" (not shown) may be returned from billing computer interface 701 to billing computer 110 in response to each transaction sent by billing computer 110 so as to acknowledge receipt of the previous transaction. An acknowledgement may also be sent to billing computer 110 upon actual transmission of a message to a subscriber terminal. Such an acknowledgement may, for example, be used to initiate billing for a message after it has actually been sent where the message is scheduled in advance (such as a "Happy Birthday" message for a subscriber that is scheduled a month in advance).

The use of "XX" herein denotes an ending byte which can be variable, depending on message contents.

1. MESSAGE COMMANDS a. Add/Change Message Control

This command is used to define an on-screen message to be transmitted to a group of subscriber terminals. Any subscriber assigned to a specified group will receive the message. This command should be followed by one or more Add/Change Message Text commands. Only one message may be active for a particular group at any point in time. An "add" occurs if the message control information for a particular message number is being sent for the first time. A "change" occurs if the message control information has already been transmitted, but additions or corrections to the control fields are necessary.

| Format: | Byte | Description |
|---|---|---|
| | 1–2 | 79 |
| | 3–7 | Message Number |
| | 8 | Line 1 Size |
| | 9–10 | Background Color |
| | 11 | On-Screen Message Alert |
| | 12 | Pre-blank Screen |
| | 13 | Buzzer |
| | 14 | External Contacts |
| | 15–17 | Buzzer/Contacts Duration |
| | 18 | AC Relay operation |
| | 19–20 | Priority |
| | 21–50 | Message Description | b. Add/Change Message Text

This command is used to define one 240-character page of an on-screen text message. It should be sent following an Add/Change Message Control command. An "add" occurs if the message text for this message number is being sent for the first time. A "change" occurs if the message text has already been received, but additions or corrections to the text pages are necessary. The number of screens field specifies the number of Add/Change Message Text commands to be sent to completely specify an on-screen message. The text could originate from a computer file, by direct user input (for example, from a text editor), or other sources.

The screen number can start at any number and then increment toward the final screen number until the final transaction, when they will be equal. If this command must be prematurely terminated without completing the transmission of the entire number of screens indicated, then an Abort Download Command may be used for this purpose. Once this command is issued, only the Abort Download Command will be properly accepted. All other commands will be rejected until the number of text screens associated with a particular message number have been received by system control computer 120. Deleting screens that are part of a message is accomplished by setting the first character of the character codes field to an 'FF'. This will delete not only the screen number in this transaction but also any screens above it.

Up to a maximum of, for example, 240 characters (10 lines×24 characters) may be specified. Each screen character may be represented by a 2 byte character cede. The checksum (if included) and carriage return delimit the message text. If fewer than the maximum number of characters is specified, only the normal transmission carriage return is used to terminate the field.

| Format: | Byte | Description |
| --- | --- | --- |
| | 1-2 | 78 |
| | 3-7 | Message Number |
| | 8-9 | Screen Number |
| | 10-11 | Final Screen Number |
| | 12-XX | Character Codes | c. Add/Change Schedule for Terminal or Group Message

This command is used to schedule an on-screen message to be transmitted to a particular group or terminal. An "add" occurs if the group or terminal association to this message number is being made for the first time. A "change" occurs if the association to this message number has already been done, but the schedule information needs to be altered. To schedule a group message, the group code and headend code should be filled, then the serial number set to all zeros. The terminal type is ignored once the zero serial number is detected. To schedule a terminal message, the serial number and terminal type are filled, then the group code is set to all zeros. The headend code is ignored once the zero group code is detected. Filling the group code or serial number with zeros determines which is to be used for the scheduling. Whichever is non-zero is scheduled. It would be improper to set both group code and serial number to a non-zero value in the same transaction.

It is also possible to assign a group or terminal to a message without scheduling it. To accomplish this, the group code or serial number is used as described above, but the month field (yyMMdd) is set to zeros for both the start and stop dates. This assigns either the group or terminal to the message number without putting it in the schedule to go out.

| Format: | Byte | Description |
| --- | --- | --- |
| | 1-2 | 77 |
| | 3-5 | Group Code |
| | 6-7 | Headend Code |
| | 8-16 | Serial Number |
| | 17-18 | Terminal Type |
| | 19-23 | Message Number |
| | 24-29 | Start Date (yymmdd) |
| | 30-33 | Start Time (hhmm) |
| | 34-39 | Stop Date (yymmdd) |
| | 40-43 | Stop Time (hhmm) | d. Delete Group or Terminal Message

This command is used to delete an on-screen message or delete a group or terminal association with a specific message. To delete a group association, the group code and headend code are filed, then the serial number is set to all zeros. The terminal type is ignored once the zero serial number is detected. To delete a terminal association, the serial number and terminal type are filled, then the group code is set to all zeros. The headend code is ignored once the zero group code is detected. Filling the group code or serial number with zeros determines which is to be used for the association deletion. Whichever is non-zero is deleted. If both group code and serial number are set to a zero value, the message number alone is used for the deletion process and all groups and terminal associations with that message number along with the message control information and its message text are all deleted.

| Format: | Byte | Description |
| --- | --- | --- |
| | 1-2 | 76 |
| | 3-5 | Group Code |
| | 6-7 | Headend Code |
| | 8-16 | Serial Number |
| | 17-18 | Terminal Type |
| | 19-23 | Message Number |

2. GROUP COMMANDS a. Add/Change Selection Criteria or List Group

This command is used to create a selection criteria group to which a series of subscriber terminals are to be assigned.

| Format: | Byte | Description |
| --- | --- | --- |
| | 1-2 | 42 |
| | 3-5 | Group Code |
| | 6-7 | Headend Code |
| | 8-37 | Group Description |
| | 38 | Selection Criteria Flag |
| | 39-XX | Selection Criteria Statement (described herein) | b. Assign Terminal To List Groups

This command is used to specify the groups to which a subscriber terminal is assigned. If all group codes are valid, a single return code will be returned. If the command contains invalid group codes, a return code and group code for each invalid entry is returned. An error return code will be issued for any group code which has a headend that is not associated with the serial number of the terminal specified in the command. If a group code is used that currently does not exist, a group will be created using the headend code associated with the serial number used in this command. An error will be returned if the serial number is not part of the system control computer database. The last two data bytes in a command response with invalid group codes have a value of 00.

A variable number of group codes may be specified per subscriber terminal. The checksum (if included) and carriage return delimit the message text. If fewer than the maximum number of characters is specified, only the normal transmission carriage return is used to terminate the field.

| Format: | Byte | Description |
| --- | --- | --- |
| | 1-2 | 43 |
| | 3-11 | Serial Number |
| | 12-13 | Terminal Type |
| | 14-XX | Group Codes | c. Add Terminals To List Group

This command is used to specify which subscriber terminals belong to a particular group. Multiple commands can be used to fully define the population of a group. In one embodiment, a maximum of 22 (for example) subscriber terminals may be specified in this command. The actual maximum number may be changed to suit particular needs, including considerations such as, for example, manageability of message size. The checksum (if included) and CR delimit the serial number list. If fewer than the maximum number of serial numbers are specified, only the normal transmission carriage return is used to terminate the field.

If all serial number/terminal type combinations in an Add Terminals To Group command are valid, the command response consists of a single return code. If the command contains invalid serial number/terminal type combinations, a return code, serial number, and terminal type for each invalid entry are returned. An error return code will be issued for any serial number that does not belong to the headend specified in the command. An error return code will be issued if the group code is not associated with the headend code specified. If a group code is used that currently does not exist, a group will be created on the headend specified in this command. The last two data bytes in a command response with invalid serial number/terminal type combinations have a value of 00.

| Format: | Byte | Description |
|---|---|---|
| | 1-2 | 44 |
| | 3-5 | Group Code |
| | 6-7 | Headend Code |
| | 8-16 | Serial Number #1 |
| | 17-18 | Terminal Type |
| | 19-27 | Serial Number #2 |
| | 28-29 | Terminal Type |
| | . | |
| | . | |
| | . | |
| | 239-247 | Serial Number #22 (or maximum) |
| | 248-249 | Terminal Type | d. Remove Terminals From List Group

This command is used to remove subscriber terminals from a particular group. Up to a maximum number (for example, 22) of subscriber terminals may be specified in this command. The checksum (if included) and CR delimit the serial number list. If fewer than the maximum number of serial numbers are specified, only the normal carriage return is used to terminate the field.

If all serial number/terminal type combinations in a Remove Group Terminal command are valid, the command response consists of a single return code. If the command contains invalid serial number/terminal type combinations, a return code, serial number, and terminal type for each invalid entry is returned. An error return cede will be issued for any serial number that does not belong to the headend specified in the command. An error return code will be issued if the group code is not associated with the headend code specified. The last two data bytes in a command response with invalid serial number/terminal type combinations have a value of 00.

| Format: | |
|---|---|
| Byte | Description |
| 1-2 | 45 |
| 3-5 | Group Code |
| 6-7 | Headend Code |
| 8-16 | Serial Number #1 |

| -continued | |
|---|---|
| Format: | |
| Byte | Description |
| 17-18 | Terminal Type |
| 19-27 | Serial Number #2 |
| 28-29 | Terminal Type |
| 239-247 | Serial Number #22 (or maximum number) |
| 248-249 | Terminal Type | e. Clear Group

This command is used to remove all subscriber terminals from a particular group. Once the terminals have been cleared, the group code number is removed from the system and is free to be used for creation of a new group.

| Format: | |
|---|---|
| Byte | Description |
| 1-2 | 46 |
| 3-5 | Group Code |
| 6-7 | Headend Code | f. Initiate Group Download

This command informs the system control computer that a complete download of all terminals for a specific group code and headend code is beginning from the billing computer. After reception of this command, no other commands other than Add Terminals To Group, Abort Download, and Download Complete will be accepted.

| Format: | |
|---|---|
| Byte | Description |
| 1-2 | 47 |
| 3-5 | Group Code |
| 6-7 | Headend Code | g. Abort Download, Code (28)
h. Download Complete, Code (29)

These commands are used to accomplish an Abort or Completion of a Group Download in the same manner as when a Terminal Download is in progress.

3. FIELD NAME DESCRIPTIONS

The following list describes the fields comprising the commands presented in the previous section. The description identifies the field type, field length, and use.

Serial Number (9 bytes alphanumeric)—This field is the external identification of an addressable subscriber terminal.

Terminal Type (2 bytes alphanumeric)—This field identifies the terminal type. Scientific-Atlanta addressable terminals are identified as "SD".

Group Code (3 bytes numeric)—This field identifies a group. A subscriber terminal may be assigned to one or more of, for example, 62 groups. A range of valid values may be, for example, 001 to 062. Additional groups may be defined based on memory availability and system expansion requirements. Group code (64, which is defined as the global group, is also valid when used in Add/Change Schedule for Terminals or Group Message command. A message which is defined for this group will be received by all terminals on a headend.

Headend Code (2 bytes alphanumeric)—This field identifies the headend which controls an addressable terminal. The headend code is correlated to a port on system control computer 120 through which terminal commands are transmitted.

Message Number (5 bytes numeric)—This field is an identification code for an on-screen message. The range of valid values may be, for example, 00001 to 09999.

Start Date (6 bytes numeric)—This field identifies the start date for the transmission of an on-screen group or terminal message. The first two bytes are used to identify the year, i.e. "93" for 1993. Bytes 3 and 4 are used to specify the month, i.e. "01" for January, "02" for February, etc. If the month field is set to "00" it indicates that the Start Date is not used for this transaction. The last two bytes are used to identify the day of the month.

Start Time (4 bytes numeric)—This field identifies the start time for the transmission of an on-screen message. The first two bytes are used to identify the hour in military time and the last two bytes are used to identify the minutes, i.e. "0100" for 1:00 a.m., "1330" for 1:30 p.m.

Stop Date (6 bytes numeric)—This field identifies the stop date for the transmission of an on-screen group or terminal message. The first two bytes are used to identify the year, i.e. "93" for 1993. Bytes 3 and 4 are used to specify the month, i.e. "01" for January, "02" for February, etc. If the month field is set to "00" it indicates that the Stop Date is not used for this transaction. The last two bytes are used to identify the day of the month.

Stop Time (4 bytes numeric)—This field identifies the stop time for the transmission of an on-screen message. The first two bytes are used to identify the hour in military time and the last two bytes are used to identify the minutes, i.e. "0100" for 1:00 a.m., "1330" for 1:30 p.m.

Line 1 Size (1 byte numeric)—This field is used to specify the size of the first line of an on-screen message. A value of "1" is used to indicate that the first line of the message is to be normal size. A value of "2" is used to indicate that the first line is to be two times normal size and half the number of characters.

Background Color (1 byte numeric)—This field is used to specify the background of an on-screen message. The valid values are as follows:

| Value | Background |
|---|---|
| 1 | medium intensity blue |
| 2 | low intensity blue |
| 3 | high intensity blue |
| 4 | black |
| 5 | green |
| 6 | blue |
| 7 | red |
| 8 | magenta |
| 9 | purple |

While this list of colors is by way of example, a larger or smaller number of colors may be provided without departing from the scope of the present invention. The number and type of color may depend on system requirements or user preferences, for example.

On-screen Message Alert (1 byte Alphabetic)—This field is used to indicate whether or not an on-screen alert is to be enabled in conjunction with an on-screen message. The valid values are "Y" and "N".

LED Alert (1 byte Alphabetic)—This field is used to indicate whether or not an LED alert is to be enabled in conjunction with an on-screen message in systems with subscriber terminals which support such an LED. Examples of subscriber terminals which support such an alert include Scientific-Atlanta models 8100 and 8601.

Buzzer (1 byte Alphabetic)—This field is used to specify whether or not a buzzer is to be enabled in conjunction with an on-screen message in systems with subscriber terminals which support this feature.

External Contacts (1 byte Alphabetic)—This field is used to specify whether or not the external contacts are to be enabled in conjunction with an on-screen message. The valid values are "Y" and "N".

Buzzer/Contacts Duration (3 bytes numeric)—This field is used to specify the duration, in minutes, of the buzzer and external contacts in conjunction with an on-screen message in systems with subscriber terminals which support this feature. The range of valid values is 000 to 255.

AC Relay Operation (1 byte Alphabetic)—This field is used to specify whether or not an AC relay coupled to the subscriber terminal is to be enabled in conjunction with an on-screen message. This AC relay may control, for example, a switched power outlet to control various household appliances such as a lamp. The valid values are "Y" and "N".

Priority (2 bytes numeric)—This field is used to specify the priority of an on-screen message. The priority indicates the order in which messages are displayed by subscriber terminals. Priority 01 messages are displayed immediately upon reception. Messages with priority 02 and 03 are displayed using the message option on the on-screen menu.

Screen Number (2 bytes numeric)—This field is used to specify the sequence number of a screen of text in a multi-screen on-screen message. The range of valid values is 01 to 16.

Final Screen Number (2 bytes numeric)—This field is used to specify the final text screen sequence number in a multi-screen on-screen message. The range of valid values is 01 to 16.

Group Description (30 bytes Alphanumeric)—This field is a description of a group code used to send an on-screen message.

Enable Flag (2 bytes numeric)—identifies whether a subscriber terminal is:

| 00 | Disabled |
|---|---|
| 01 | Enabled |
| 02 | Temporarily Enabled |
| 03 | Fast Poll |

Selection Criteria Flag (1 byte Alphabetic)—This field is used to specify whether or not the group to be populated is of the selection criteria type (Y)es, or the list of terminals type (N)o. The valid values are "Y" and "N".

SELECTION CRITERIA STATEMENTS

Selection criteria statements allow groups of subscriber terminals to be specified by a concise reference to criteria the desired terminals share in common. These statements can be created by a user from user interface 702 (see FIG. 7) using a screen layout such as that depicted in FIG. 18. Alternatively, these statements can be generated by billing computer 110 in response to a computer program or user input on billing computer 110. If a selection criteria statement is generated by billing computer 110, it can be transmitted to system control computer 120 by using the Add/Change Selection Criteria or List Group command, described previously under Group Commands.

Selection criteria statements may be used as part of an automatic reply scheme in which system control computer 120 sends a transaction to all subscriber terminals meeting specific criteria to request that they respond to system control computer 120 to report any subscriber purchases of impulse pay-per-view events. For example, system control computer 120 could request that all subscriber terminals which have HBO service respond with pay-per-view information. The use of selection criteria statements in this regard allows the range of subscriber terminals to be more narrowly focused than would otherwise be possible.

Selection criteria statements may also be used to selectively refresh subscriber terminals. One way a cable subscription operator can maintain security against unauthorized access to cable channels is by programming subscriber terminals to automatically "expire" after a preprogrammed period of time. A refresh timer in system control computer 120 may periodically send a refresh signal to all authorized terminals to reset the expiration timer in the authorized terminals. By using selection criteria statements, system control computer 120 can select groups of subscriber terminals for refresh (for example, select all subscriber terminals having HBO for refresh).

Selection criteria statements can also be used to select subscriber terminals for collection of viewer statistics. As disclosed in commonly assigned U.S. patent application Ser. No. 07/671,532, incorporated herein by reference, statistics regarding program viewing habits may be collected by system control computer 120 from subscriber terminals. This is performed by commanding subscriber terminals to transmit back to system control computer 120 a record of the channels viewed by the viewers having the subscriber terminals. Using selection criteria statements, system control computer 120 may select groups of subscriber terminals to collect these statistics based on any criterion or combination of criteria stored in the system control computer database. For example, a group of subscriber terminals can be created which includes all subscriber terminals which are authorized for the Disney channel, then these subscriber terminals may be selectively queried to retrieve viewing statistics for these subscriber terminals.

Selection criteria statements can also be used to selectively authorize text channels or other services to particular subscriber terminals. For example, a group could be created having all subscriber terminals which are authorized for HBO. This group of subscriber terminals could then be given access to a special channel which shows special events. Alternatively, this group could be given access to the Disney channel free for a week. Further information regarding time-authorized channels can be found in commonly assigned U.S. application Ser. No. 07/896,582. Other uses include selectively rebuilding headends, dealing with security levels and any other operations associated with system control computer 120.

Selection criteria statements consist of combinations of operands and operators, as described below. The following are a suggested set of operands which can be used to identify subscriber terminals based on data stored in system control computer 120:

| Operand | Description | Example Value |
| --- | --- | --- |
| SN# | Serial Number of Terminal | CL190CDQZ |
| DA# | Digital Address | 2032CE3 |
| ST# | Subscriber Terminal Status | 01 (enabled) |
| SC# | Service Code | HB (HBO) |
| FE# | Subscriber Terminal Feature | RC (remote control) |
| HE# | Headend Code | 01 |
| MN# | Subscriber Terminal Model | 8600 |
| OR# | Orders | 1234 (event ID) |

The following are a suggested set of operators which can be used in a criteria selection statement with operands and values to specify a particular group of subscriber terminals:

| Operator | Description |
| --- | --- |
| & | logical AND |
| \| | logical OR |
| ! | logical NOT |
| = | equal to |
| > | greater than |
| >= | greater than or equal to |
| < | less than |
| <= | less than or equal to |
| ( | left parenthesis for joining operators |
| ) | right parenthesis for joining operators |
| { | start of exclusive selection of service codes only |
| } | end of exclusive selection of service codes only |
| , | separator for more than one exclusive service code |

Criteria Selection Statement Example #1

SC#=BA & SC#=HB

This statement selects all terminals that have both Basic (BA) AND HBO (HB) service codes. The terminal could have other service codes also.

Criteria Selection Statement Example #2

ST#=01 & (SC#=CM|SC#=BA) & (SN#>AA1111111 & SN#<=AA9999999)|DA#<05FFFFF & FE#!=63

This statement selects all terminals that are enabled (01), AND have either CineMax (CM) OR Basic Service (BA), AND are either in the Serial Number range GREATER THAN AA1111111 AND LESS THAN or EQUAL to AA9999999 OR have a Digital Address LESS THAN 05FFFFF AND are NOT enabled for Remote Control (63).

Criteria Selection Statement Example #3

SC#={BA,HB}

This statement selects all terminals that only have the services BA and HB. Because the exclusive brackets are used, any terminals that have these services plus other services will not be selected.

Criteria Selection Statement Example #4

SC#={BA}|SC#={HB}

This statement selects all terminals that have only the service BA or have only the service HB.

Criteria Selection Statement Example #5

SC#!=BA & SC#!=HB

This statement selects all terminals that do not have the service BA and also do not have the service HB.

Criteria Selection Statement Example #6

ST#=01 & HE#=01 & FE#=RC & FE#=62

This statement selects all terminals that have a status of Enabled, are on headend 01 and have the features Remote Control (RC) and Volume Control (62).

Criteria Selection Statement Example #7

(SC#=BA & (SC#=CM|SC#=XB))|SC#=HB

This statement selects all terminals that have service BA and either the service CM or XB. Also selected are all terminals that have the service HB.

Thus there has been shown and described a system and method for remotely selecting subscribers and controlling messages to subscribers in a cable television system which meets the objectives sought and solves the problems and related problems of prior art systems and should only be deemed to be limited by the scope of the claims which follow.

claim:

1. A method for selecting cable television terminals from a first computer coupled to a system control computer coupled to said cable television terminals, the method comprising the steps of:

selecting a group of subscribers through the use of desired criteria combined through logical operators which act upon a first database residing on said first computer, and forming therefrom a subscriber list comprising a plurality of cable television terminal identifiers each corresponding to a member of said group;

creating an on-screen message at said first computer intended for display to members of said group; and transmitting said subscriber list and said on-screen message from said first computer to said system control computer.

2. A method according to claim 1, further comprising the step of transmitting said on-screen message from said system control computer to cable television terminals corresponding to said terminal identifiers in said subscriber list.

3. A method according to claim 2, further comprising the step of transmitting, from said first computer to said system control computer, a starting and ending time during which said on-screen message is to be transmitted.

4. The method of claim 2, further comprising the step of notifying said first computer after said on-screen message has been transmitted to said cable television terminals corresponding to said terminal identifiers in said subscriber list.

5. A method according to claim 1, wherein said step of creating an on-screen message further comprises the step of defining display attributes of said on-screen message.

6. A method according to claim 5, wherein said display attributes include a message alert feature.

7. A method as in claim 1, wherein said step of transmitting said subscriber list and said on-screen message to said system control computer comprises the step of using a computer protocol comprising one or more transactions, each transaction including a data block and a checksum.

8. A method as in claim 7, wherein said transmitting step comprises the step of transmitting over a telephone line.

9. The method according to claim 1, wherein said selecting step comprises the step of selecting subscribers from said first database based on demographic information contained in said first database.

10. The method according to claim 9, wherein said transmitting step comprises the step of transmitting said subscriber list over a telephone line which links said first computer to said system control computer.

11. A system for selecting cable television terminals and transmitting an on-screen message to a group of one or more of said cable television terminals, comprising:

a first computer including a subscriber database comprising information which relates subscribers to terminal identifiers; and a system control computer, coupled to said first computer and including a system control database comprising information which relates said terminal identifiers to physical device information for each terminal;

wherein said first computer comprises means for selecting a group of said subscribers from said subscriber database, creating a subscriber list comprising a group of selected terminal identifiers, where said terminal identifiers satisfy the application of logical operators for combining desired values and for identifying said subscriber list, and transmitting said subscriber list and information identifying said on-screen message to said system control computer; and wherein said system control computer comprises interface means for receiving said transmitted subscriber list and said information identifying said on-screen message, retrieval means for retrieving physical device information from said system control database corresponding to said selected terminal identifiers contained in said transmitted subscriber list, and cable transmission means for transmitting said on-screen message to terminals corresponding to said selected terminal identifiers.

12. A system as in claim 11, wherein said system control computer further comprises means for notifying said terminals corresponding to said selected terminal identifiers of their participation in said group.

13. A system according to claim 11, wherein said cable transmission means uses in-band data transmission techniques.

14. A system according to claim 11, wherein said cable transmission means uses out-of-band data transmission techniques.

15. A system according to claim 11, wherein said on-screen message comprises a plurality of character compression codes to represent message data.

16. A method for creating an on-screen message and specifying recipients for the on-screen message from a first computer, comprising the steps of:

generating at said first computer a selection criteria statement which specifies a group of subscribers using criteria stored in a database residing on a system control computer coupled to said first computer, wherein said generating step comprises the step of using logical operators to combine desired values for terminal characteristics stored in said database residing on said system control computer to generate said selection criteria statement;

creating at said first computer an on-screen message intended for display to said group of subscribers; and transmitting said selection criteria statement and said on-screen message to said system control computer.

17. A method as in claim 16, further comprising the step of transmitting said on-screen message to said group of subscribers.

18. Apparatus for controlling the transmission of addressed messages to groups of subscribers of a subscription television system, said apparatus comprising:

a database comprising information which relates terminal characteristics to terminal identifiers;

computer interface means for receiving from another computer a message and a selection criteria statement comprising desired values for one or more of said terminal characteristics;

group management means, coupled to said computer interface means and to said database, for converting said selection criteria statement into a list of said terminal identifiers through the application of logical operators drawn from said selection criteria statement as applied to said database to generate said list;

system event scheduler means for scheduling said message at a future time; and device management means, coupled to and responsive to said system event scheduler means, for transmitting said message to terminals identified in said list of terminal identifiers.

19. The system control computer apparatus of claim 18, wherein said computer interface means supplies an acknowledgement to said another computer after said message has been transmitted.

20. Apparatus for controlling the transmission of a message to a plurality of terminals in a subscription television system, said apparatus comprising:

a database comprising information which relates terminal characteristics to terminal identifiers;

computer interface means for receiving from another computer said message and a list of terminal identifiers constituting a group to which said message is to be transmitted, said group identified by a group code;

group management means, coupled to said computer interface means and to said database, for storing group information regarding said list of terminal identifiers as said group as identified by said group code into said database;

system event scheduler means for scheduling said message; and device management means, coupled to and responsive to said system event scheduler means, for transmitting said message to said terminal identifiers constituting said group.

21. The apparatus of claim 20, wherein said computer interface means comprises means for receiving from said another computer a command for adding a new terminal identifier to a previously constituted group, said command including referencing said group at least through said group code; and wherein said group management means comprises means for adding said new terminal identifier to said group information in said database.

22. The apparatus of claim 20, wherein said computer interface means comprises means for receiving from said another computer a command for scheduling said message, said command including referencing said group at least through said group code; and wherein said system event scheduler means is responsive to said command for scheduling said message.

23. The apparatus of claim 20, wherein said computer interface means comprises means for receiving from said another computer a command for deleting a previously constituted group, said command including referencing said group at least through said group code; and wherein said group management means comprises means for deleting said stored group information from said database.

24. The apparatus of claim 20, wherein said computer interface means comprises means for receiving from said another computer a command for deleting a terminal from a previously constituted group, said command including referencing said group at least through said group code; and wherein said group management means comprises means for deleting said terminal from said stored group information.

25. Apparatus for selecting cable television terminals, comprising:

a subscriber database comprising information which relates subscribers to terminal identifiers; and computer means, coupled to said database, for selecting a group of said subscribers from said subscriber database, creating a subscriber list comprising a corresponding group of selected terminal identifiers, creating an on-screen message for display to members of said group of subscribers, transmitting said subscriber list and said on-screen message to a system control computer which is coupled to said apparatus, storing said group of subscribers as a group retrievable by a group code and retrieving said group by said group code; and memory means, responsive to said computer means, for storing said group retrievable by said group code, wherein said selected terminal identifiers coincide with terminal identifiers stored in a separate database in said system control computer; and wherein said subscriber database further comprises information which relates demographic data concerning said subscribers to said terminal identifiers, and wherein said computer means comprises means for creating said subscriber list on the basis of demographic criteria specified in relation to said demographic data stored in said subscriber database.

26. Apparatus for selecting cable television terminals from a first computer coupled to a system control computer, the system control computer having an associated database comprising stored terminal characteristics for the cable television terminals and data representing a group of cable television terminals as stored in response to a computer message and as retrievable by a group code, the apparatus comprising:

means for generating from the first computer said computer message comprising a selection criteria statement, said selection criteria statement comprising criteria for characterizing said group of said cable television terminals by referencing one or more desired values for said terminal characteristics stored in said system control computer database; and means for transmitting said computer message to said system control computer over a link.

27. The apparatus of claim 26, wherein said selection criteria statement comprises two of more desired values for said terminal characteristics, wherein said two or more values are logically linked using a logical operator selected from the set consisting of logical AND logical OR.

28. The apparatus of claim 26, wherein said one or more desired values comprises a range of terminal serial numbers.

29. The apparatus of claim 26, wherein said one or more desired values comprises a service code for said cable television terminals.

30. Apparatus for selecting cable television terminals from a first computer coupled to a system control computer, the system control computer having a database comprising stored terminal identifiers for the cable television terminals, the apparatus comprising:

a subscriber database comprising information relating subscriber information to said terminal identifiers stored in said system control computer database;

means for generating a computer message comprising said list group, said list group comprising a list of said terminal identifiers corresponding to subscriber data selected from said subscriber database in accordance with a desired grouping of subscribers, said desired grouping previously selected and stored as said list group in said database in said system control computer and retrievable with a group code, said computer message including said group code for identifying said list group on said system control computer; and means for transmitting said computer message to said system control computer over a link.

31. The apparatus of claim 30, further comprising means for generating and transmitting to said system control computer a second computer message comprising schedule information for selecting a message to said list group.

32. The apparatus of claim 30, further comprising means for generating and transmitting to said system control computer a second computer message comprising a command to delete one or more of said terminals from said list group.

33. The apparatus of claim 30, further comprising a generator for generating and transmitting to said system control computer message comprising a command to add one or more terminals to said list group.

* * * * *